(12) United States Patent
McManus et al.

(10) Patent No.: US 6,202,362 B1
(45) Date of Patent: Mar. 20, 2001

(54) SLIDE OUT ROOM WITH FLUSH FLOOR

(76) Inventors: Patrick W. McManus, 1023 W. Eighth St.; James E. Dewald, Jr., 517 N. Benton, both of Mishawaka, IN (US) 46544; Martin P. McManus, 1421 Hampshire Dr., South Bend, IN (US) 46614

( * ) Notice: Subject to any disclaimer, the term of this patent is extended or adjusted under 35 U.S.C. 154(b) by 0 days.

(21) Appl. No.: 09/185,840

(22) Filed: Nov. 4, 1998

Related U.S. Application Data

(63) Continuation-in-part of application No. 08/957,721, filed on Oct. 24, 1997, now abandoned.
(60) Provisional application No. 60/069,919, filed on Dec. 17, 1997.

(51) Int. Cl.[7] .............................. E04B 1/346; E04B 7/16
(52) U.S. Cl. ........................ 52/67; 296/26.08; 296/171; 296/175
(58) Field of Search ................................... 52/64, 67, 71, 52/126.1, 126.5; 296/24.1, 26.08, 26.09, 26.1, 171, 172, 175

(56) References Cited

U.S. PATENT DOCUMENTS

| | | |
|---|---|---|
| 3,046,047 | 7/1962 | Ferrera . |
| 3,106,750 | 10/1963 | Jarman . |
| 4,930,837 | 6/1990 | Marsh et al. . |
| 5,090,749 | 2/1992 | Lee . |
| 5,398,986 | 3/1995 | Koob . |
| 5,491,933 | 2/1996 | Miller et al. . |
| 5,577,351 | 11/1996 | Dewald et al. . |
| 5,586,802 | 12/1996 | Dewald et al. . |
| 5,706,612 | 1/1998 | Tillet . |
| 5,788,306 | * 8/1998 | DiBiagio et al. ................ 296/26.02 |
| 5,791,715 | * 8/1998 | Nebel ................................... 296/26 |
| 5,857,733 | 1/1999 | Dewald et al. . |

FOREIGN PATENT DOCUMENTS 1470553   1/1967   (FR) .

* cited by examiner

*Primary Examiner*—Carl D. Friedman
*Assistant Examiner*—Yvonne M. Horton
(74) *Attorney, Agent, or Firm*—Baker & Daniels

(57) ABSTRACT

A flush floor device for use on recreational vehicles having slide out rooms includes a floor of the slide out room that according to one embodiment of the invention pivots relative to the slide out room's outer wall. When the slide out room is extended, the inner edge of the auxiliary floor moves into a flush position with the main floor, and the outer edge of the auxiliary floor deflects downwardly along with the supporting extensible members. An edge unit attached to the main floor includes a nylon camming member which cams against the auxiliary floor in order to smoothly raise or lower the auxiliary floor inner edge as the slide out room is retracted or extended. According to another embodiment of the invention, a system of levers maintains the auxiliary floor generally coplanar with the main floor. According to still another embodiment of the invention, the entire slide out room is raised and lowered while maintaining the floor of the slide out room substantially horizontal.

45 Claims, 20 Drawing Sheets

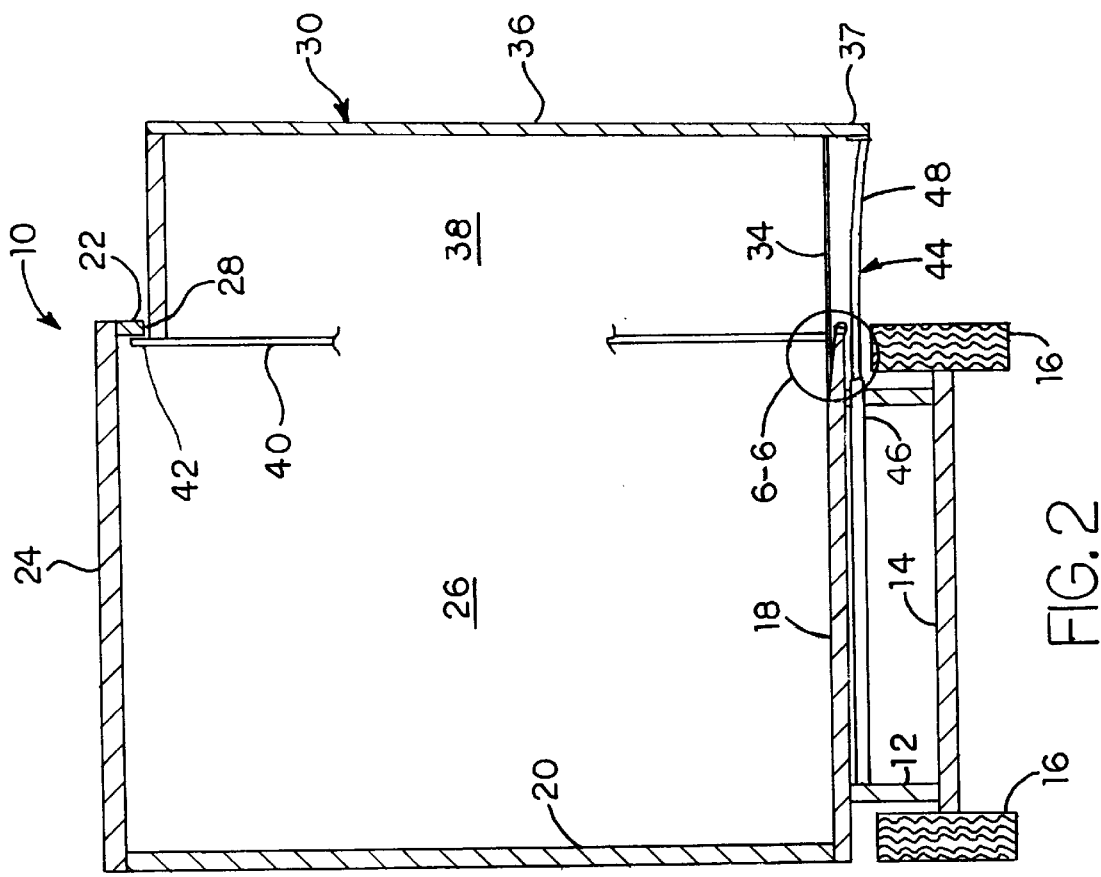
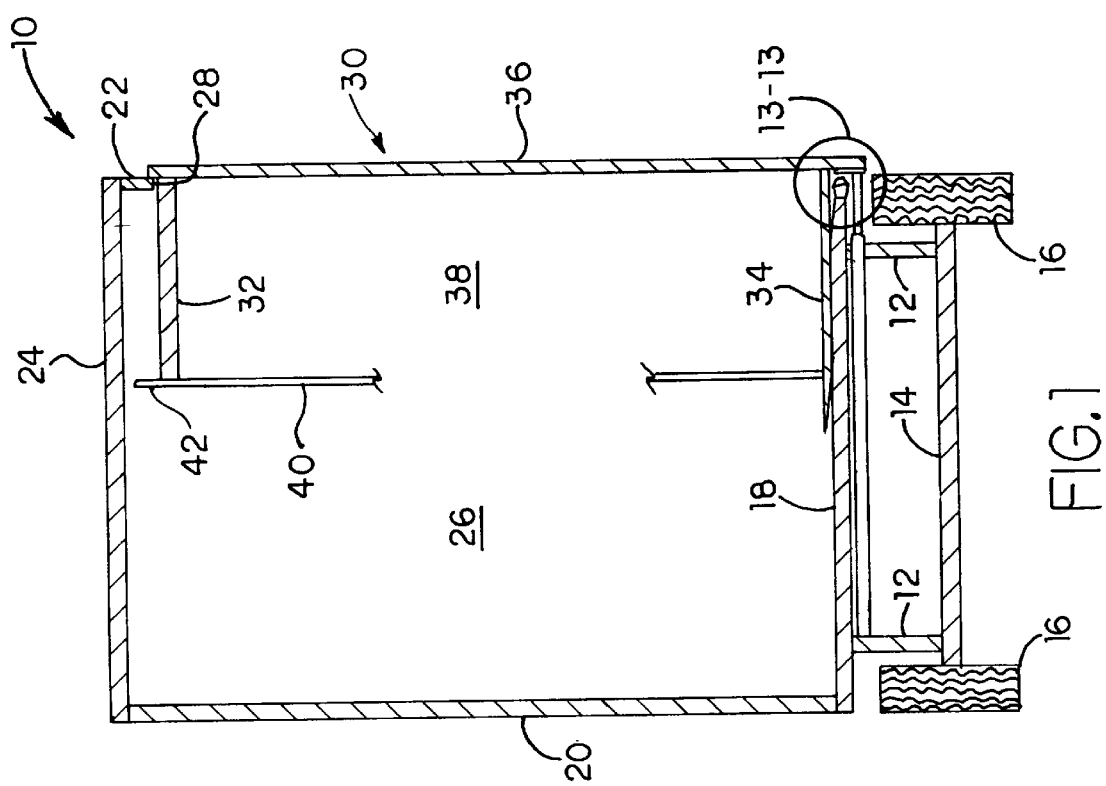

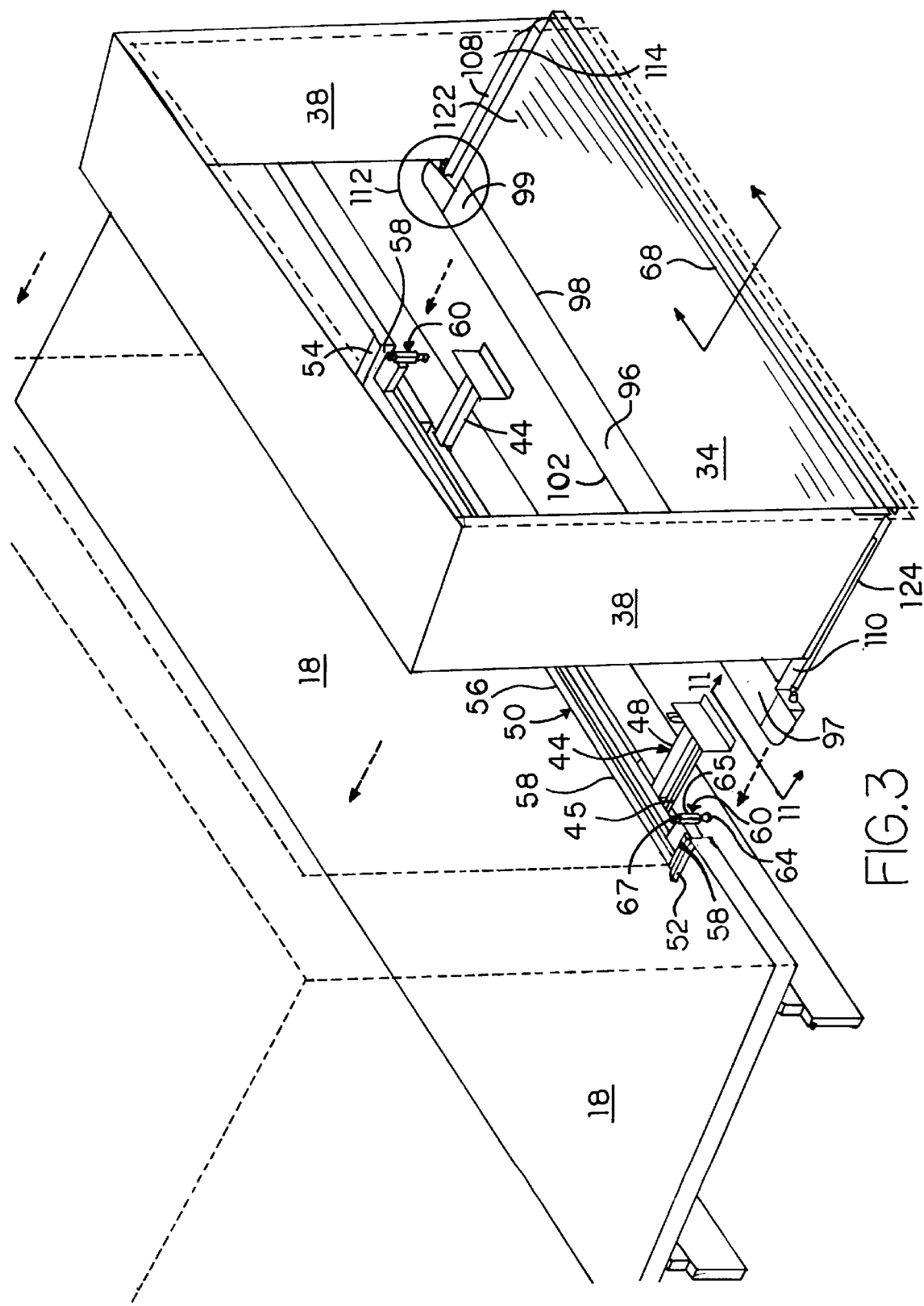

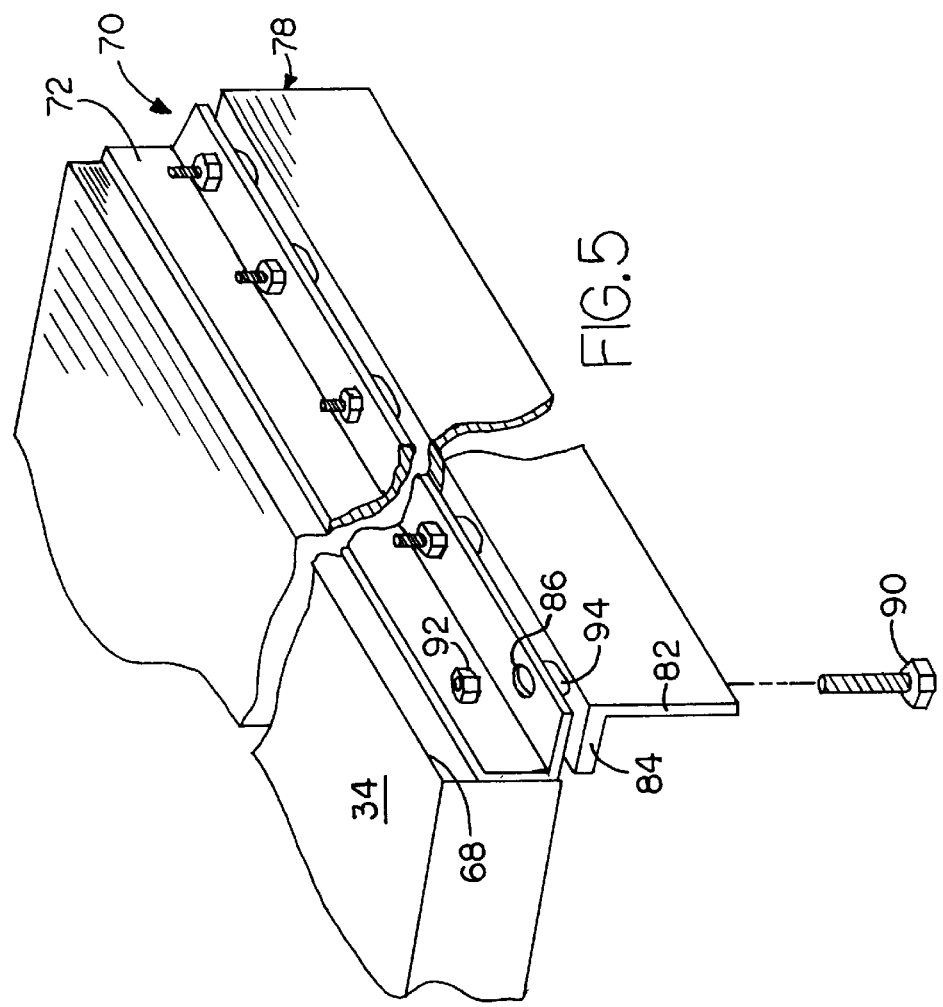
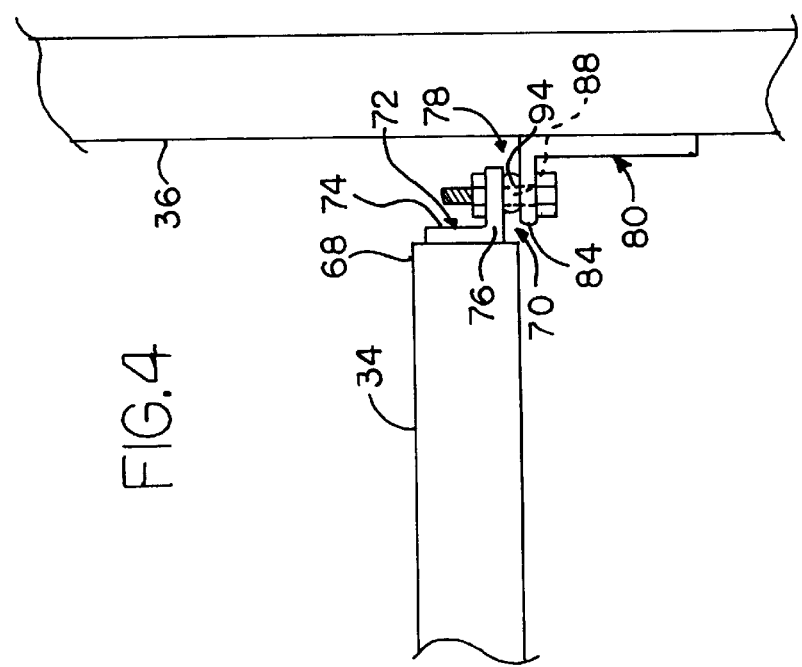

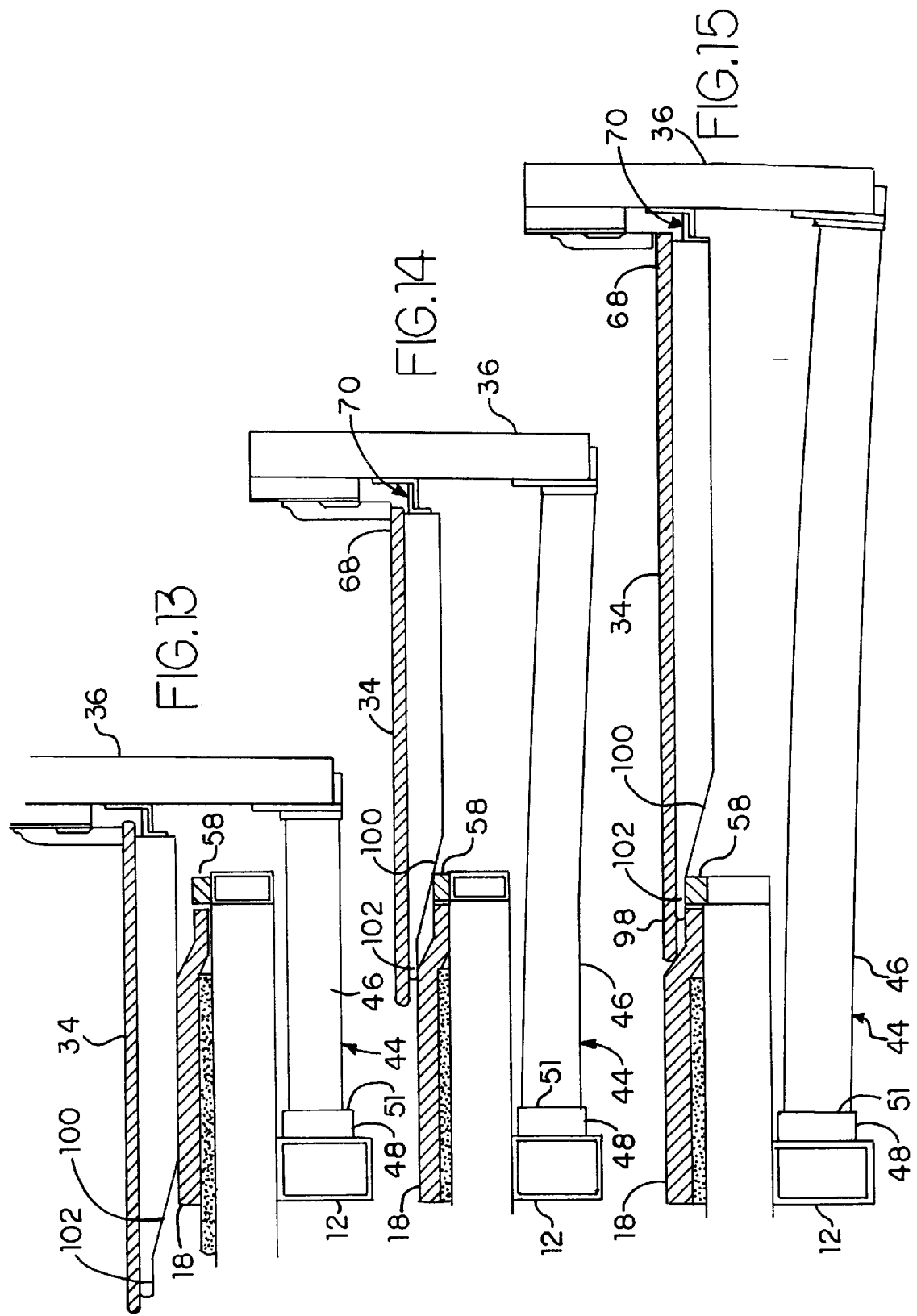

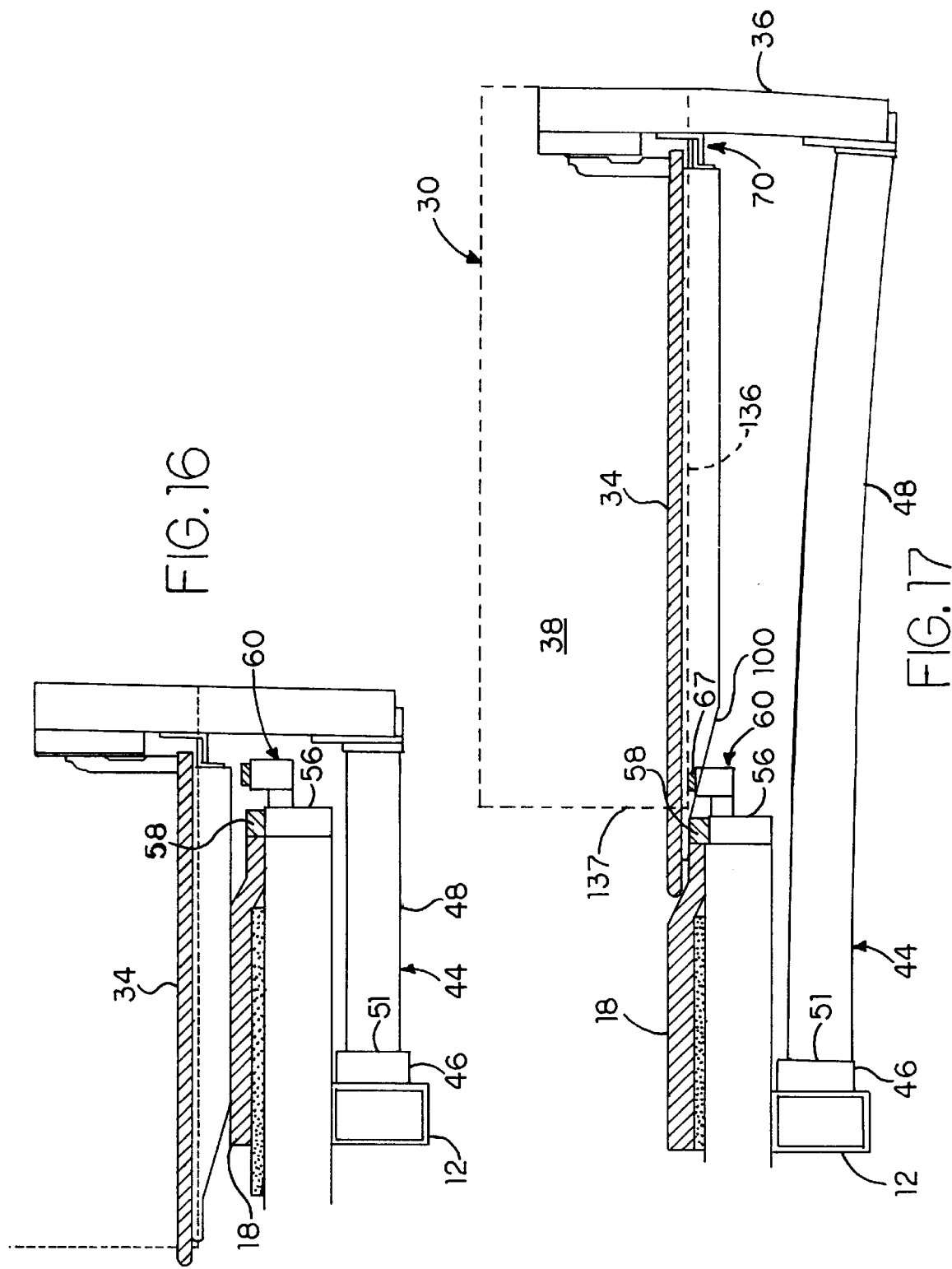

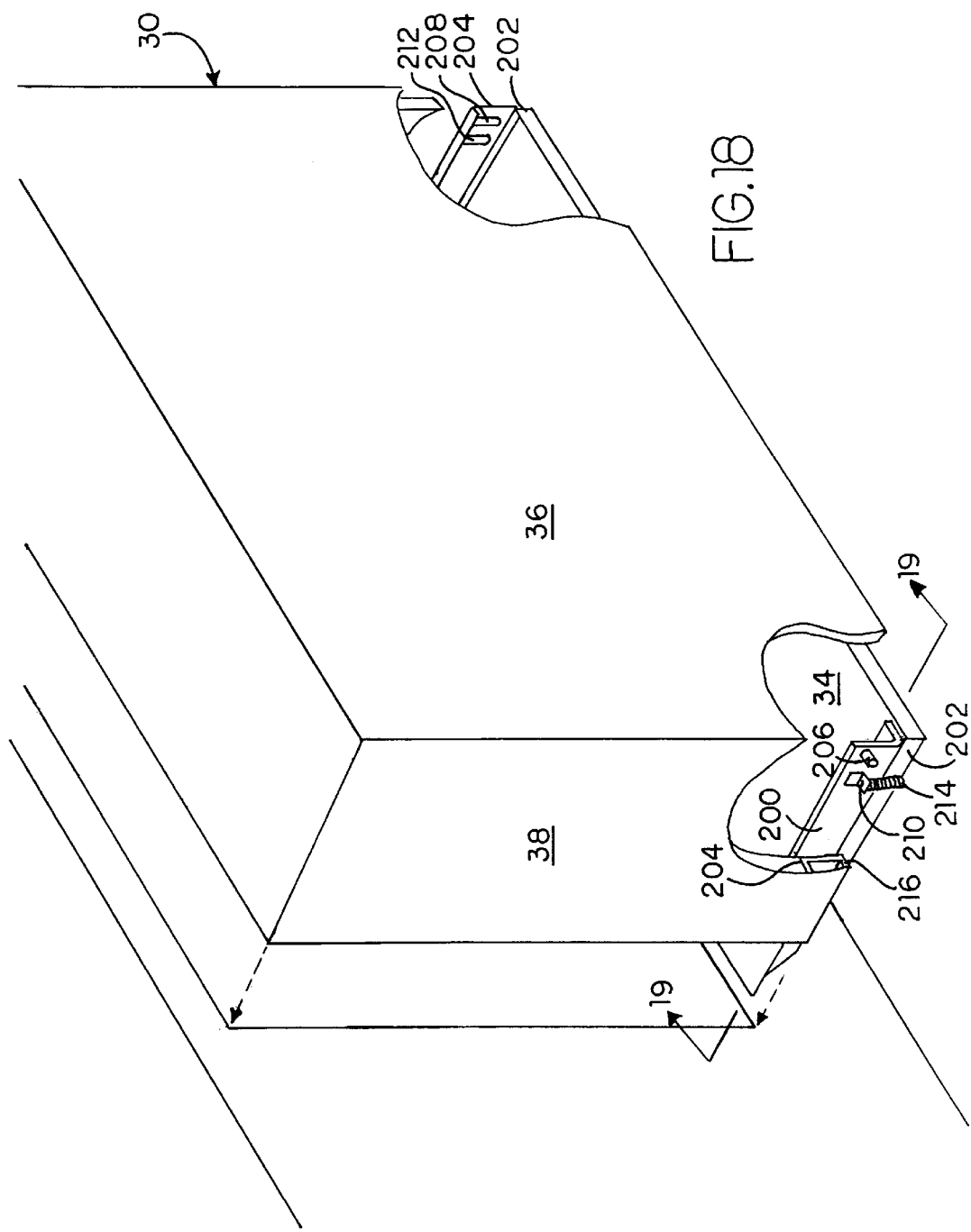

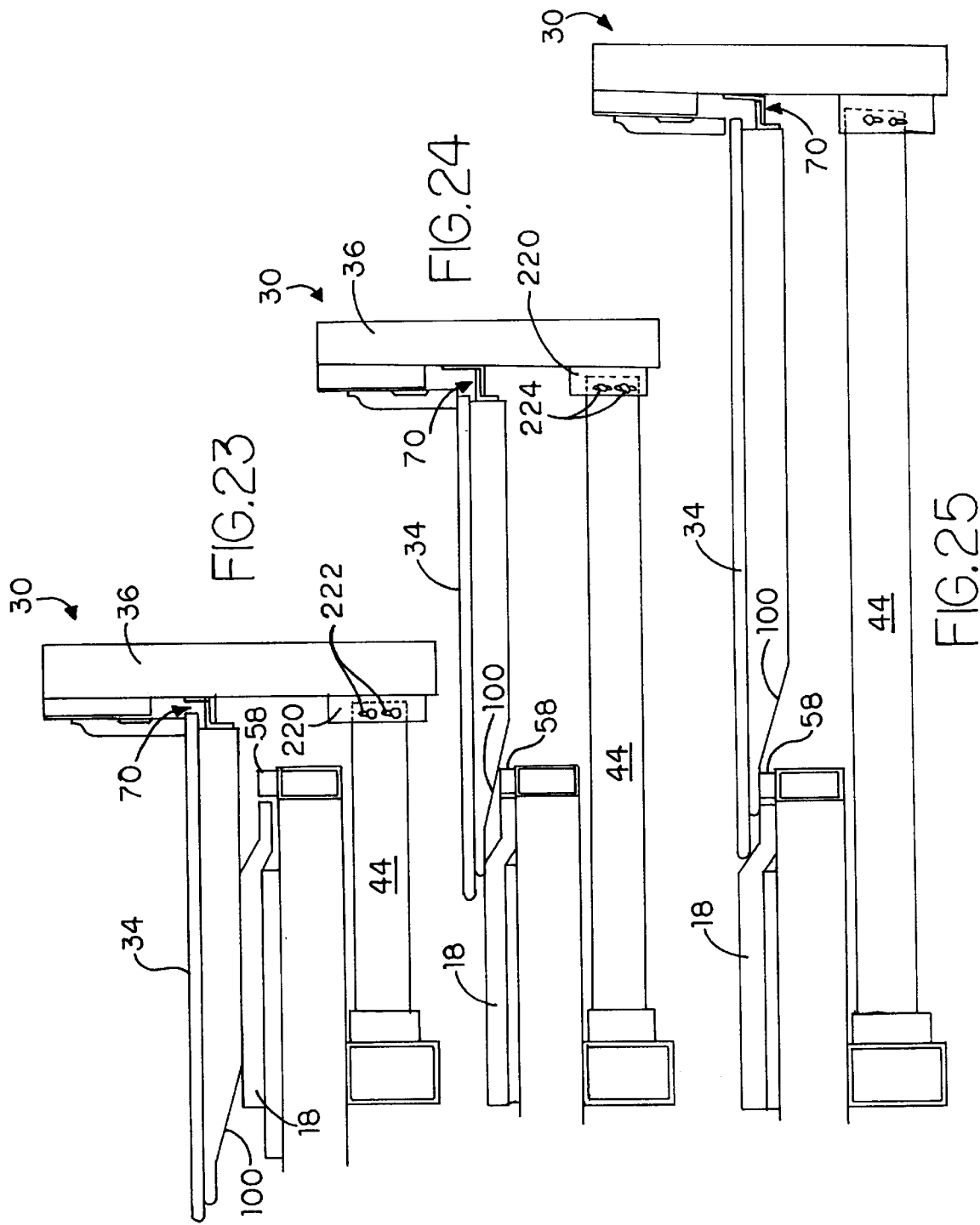

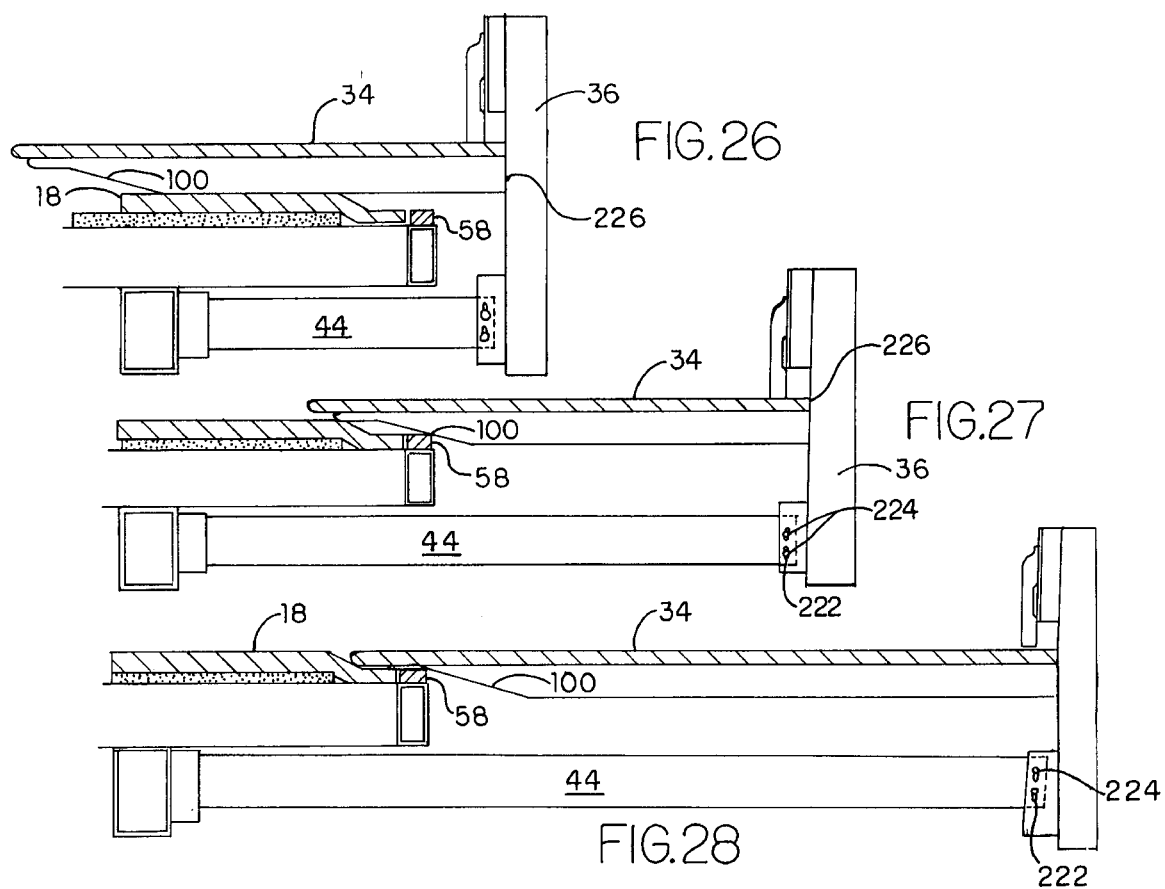

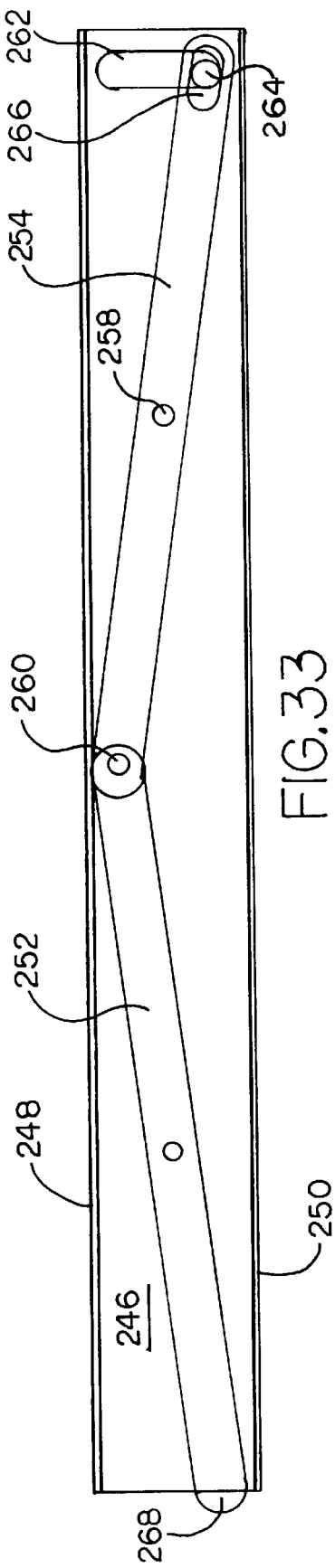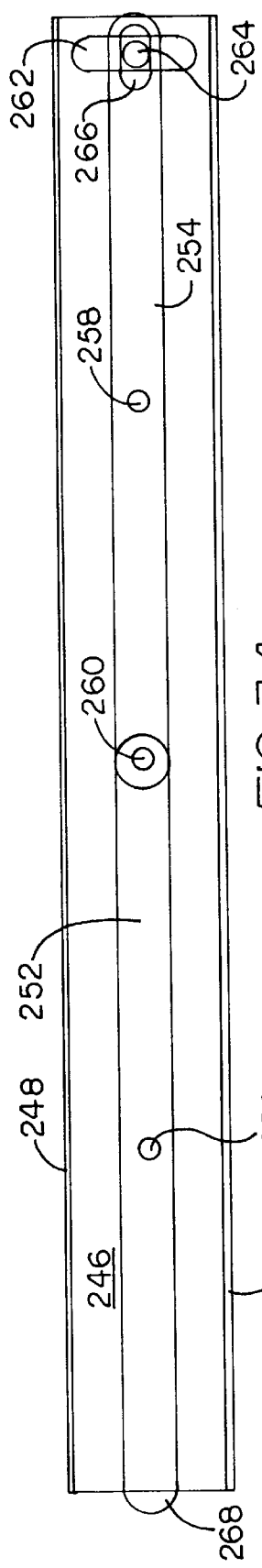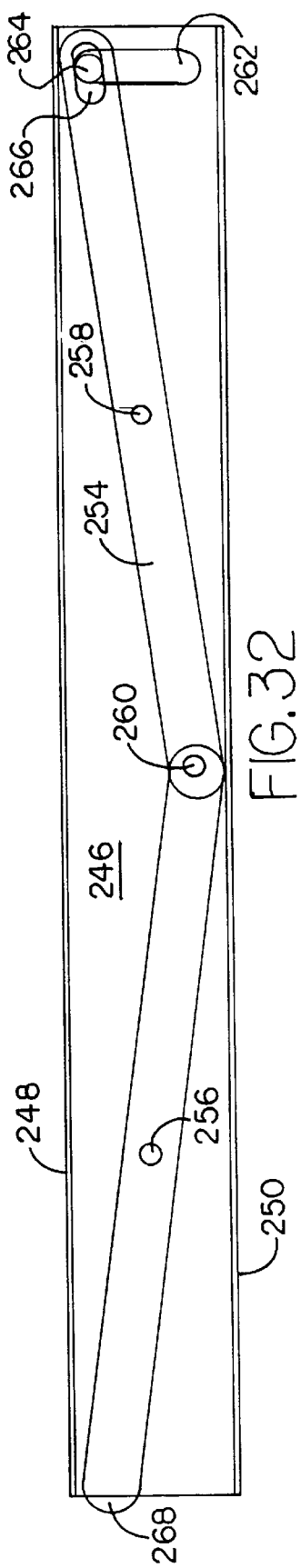

SLIDE OUT ROOM WITH FLUSH FLOOR

This application is a Continuation-in-part of U.S. patent application Ser. No. 08/957,721, filed Oct. 24, 1997 now abandoned and also claims domestic priority based upon U.S. Provisional Application Serial No. 60/069,919, filed Dec. 17, 1997.

This invention relates to a recreational vehicle or manufactured housing unit having a retractable room in which the floor of the retractable room moves into a position flush with the floor of the main living area when the retractable room is extended.

BACKGROUND AND SUMMARY OF THE INVENTION

The width of recreational vehicles is effectively limited to that which may be accommodated for travel over public roads. Accordingly, it is increasingly common to provide recreational vehicles and manufactured housing units with a slide out room which can be retracted into the main living quarters when the product is being moved or driven, but which can be extended from the main living quarters to provide auxiliary living space when the unit is parked for use or when the manufactured home is assembled at the home site. When the room is retracted into the main living quarters, the floor of the retractable room must slide over the floor of the main living quarters, and hence the level of the retractable room floor must be offset from the main floor when the retractable room is retracted. On the other hand, when the retractable room is extended to provide additional living space, most consumers find difference in floor levels between the main living quarters and the extended room to be quite inconvenient, and thus a variety of mechanisms have been developed in order to bring the slide out room floor flush with the floor of the main living area.

One such mechanism to level out the floors is to drop the entire retractable room to a level in which the level of the retractable room floor is flush with the main floor. However, the available headroom in the slide out room is less than that available in the main living area in order to permit the slide out room to retract into the main living area. Furthermore, the entire slide out room tilts during extension and retraction, thus causing furniture and other household goods in the slide out room to sift about. Another such leveling mechanism uses a moveable floor which moves up and down relative to the walls and ceiling of the slide out room as the slide out room is moved into its extended position, which requires a lifting mechanism at both the inner and outer edges of the slide out room floor.

The present invention provides a slide out room with a floor area that is flush with the floor in the main living area, yet the present flush floor does not detract from the available headroom in the slide out room. The present flush floor mechanism also dispenses with any lifting and lowering mechanism at the outer edge of the slide out room floor, and is thus more reliable than are prior art methods. The outer edge of the slide out floor is hinged to the outer wall of the slide out room, and the hinge permits the inner edge of the floor to drop automatically into a flush position when the room is extended. Meanwhile, the outer edge of the floor drops by taking advantage of the natural deflection of the support structure, so that the slide out floor is level with the main floor. In some of the embodiments of the present invention, the floor of the slide out room moves relative to the walls; in other embodiments, the entire room shifts vertically but the floor is maintained substantially horizontal.

The present invention also allows for the independent adjustment of the slide out room when the room is in the extended position, so that the height of the slide out room can be raised or lowered without adversely affecting the elevation of the floor. Furthermore, some embodiment of the present invention use a novel edge assembly on the side edges of the slide out room floor which permit the floor to float freely and independently of the slide out room walls when the room is extended. When the room is retracted, the edge assembly engages the sidewalls of the slide out room and lifts the inner edge and sidewalls off of the floor of the main living area, which saves wear and tear on the carpet or tile flooring. The edge assembly also incorporates an improved sealing mechanism, which prevents the ingress of water, dirt or other contaminants when the slide out room is extended. Accordingly, it is an object of this invention to provide a slide out room that has a floor that is flush with the floor of the main living quarters.

It is another object of this invention to provide a slide out room having a flush floor that dispense with moveable parts or linkage mechanisms on the outer edge of the slide out room floor.

Another object of this invention to provide a slide out room having an improved sealing mechanism.

A still further object of this invention is to provide a slide out room that does not inflict excess wear and tear on the flooring of the main living quarters when the slide out room is extended or retracted.

These and other objects of the invention will become readily apparent to those skilled in the art upon a reading of the following description.

BRIEF DESCRIPTION OF THE DRAWINGS

FIG. 1 is a cross sectional view of the mobile living quarters incorporating a retractable or slide out room; the slide out room being shown in the retracted position retracted into the main living quarters;

FIG. 2 is a cross sectional view similar to that shown in FIG. 1 but showing the slide out room in the extended position;

FIG. 3 is a fragmentary exploded view in perspective of the slide out room shown in FIGS. 1 and 2; the outer wall of the slide out room has been cut away for clarity;

FIG. 4 is an enlarged fragmentary cross-sectional view taken along lines 4—4 of FIG. 3 showing the extendable support member attached to the moveable frame and also showing the hinged connection between the auxiliary floor outer edge and the moveable frame assembly;

FIG. 5 is an enlarged fragmentary view in perspective of the hinge connection illustrated in FIG. 4 shown with portions of the slide out room outer wall cut away;

FIG. 13 is an enlarged fragmentary cross-sectional view taken along the circumscribed portion of FIG. 1 showing the slide out room in the retracted position;

FIG. 14 is a fragmentary cross-sectional view similar to that shown in FIG. 13 but showing the slide out room between the extended and retracted positions; the moveable floor is shown camming against the edge of the main floor;

FIG. 15 is a fragmentary cross-sectional view similar to that shown in FIGS. 13 and 14 but showing the slide out room in the extended position;

FIG. 16 is a fragmentary cross-sectional view similar to that shown in FIG. 15 with the retractable room in the retracted position; the dotted lines illustrate the sidewalls which are supported by the raised floor via the end cover;

FIG. 17 is a fragmentary cross-sectional view similar to that shown in FIG. 16 but with the retractable room shown in the extended position; the dotted lines illustrate the sidewalls which are supported by the height adjustment mechanism;

FIG. 18 is a schematic view in perspective of a slide out room made pursuant to the teachings of still another embodiment of the present invention, a portion of the wall of the slide out room being cut away to show details of the actuation support mechanism that supports and controls movement of the floor of the slide out room;

FIG. 23 is a view similar to FIG. 19, but illustrating still another embodiment of the present invention;

FIG. 24 is a view similar to FIG. 23, but illustrating the various components of the slide out room in the positions which they assume when the slide out room is moved to a position between the fully extended or fully retracted position;

FIG. 25 is a view similar to FIGS. 23 and 24, but illustrating the various components of the slide out room in the positions which they assume when the slide out room is in the fully retracted position; and FIG. 26, FIG. 27 and FIG. 28 are views similar to FIG. 23, FIG. 24 and FIG. 25 respectively, but illustrating still another embodiment of the present invention;

FIG. 32 is a cross sectional view taken substantially along lines 32—32 of FIG. 31 and illustrating the slide out floor in the raised position;

FIG. 33 is a view similar to FIG. 32, but illustrating the floor of the slide out room in a lowered position; and FIG. 34 is a view similar to FIGS. 32 and 33, but illustrating the relative position of the actuating members from slide out room in an intermediate position between the raised and lowered positions.

DETAILED DESCRIPTION OF THE INVENTION

Figure 6:
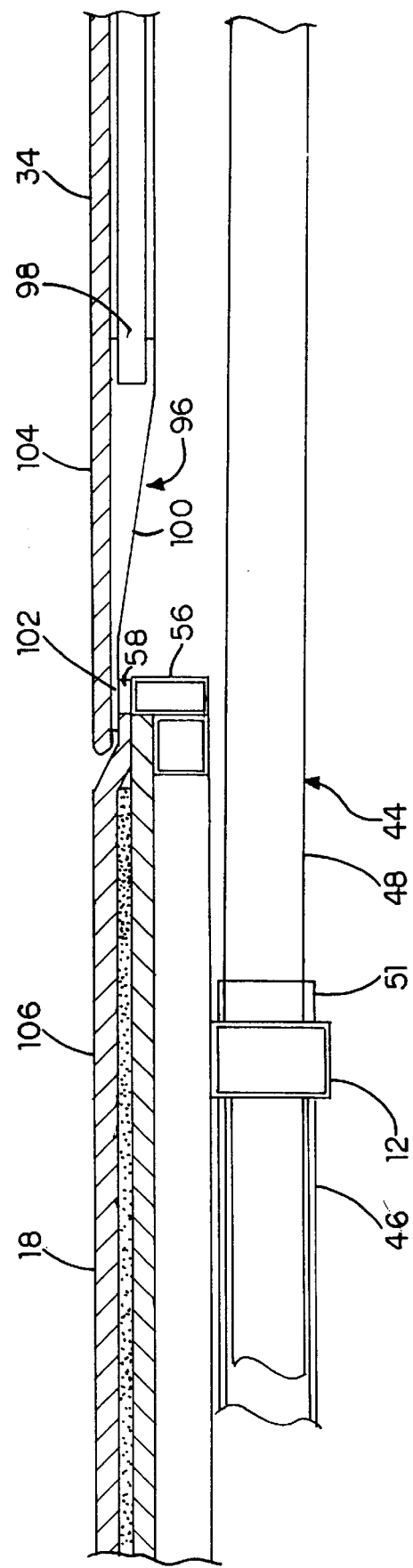
FIG. 6 is an enlarged fragmentary cross-sectional view of the circumscribed portion of FIG. 2 showing the interface between the slide out room floor and the main floor when the slide out room is in the extended position.
Figure 7:
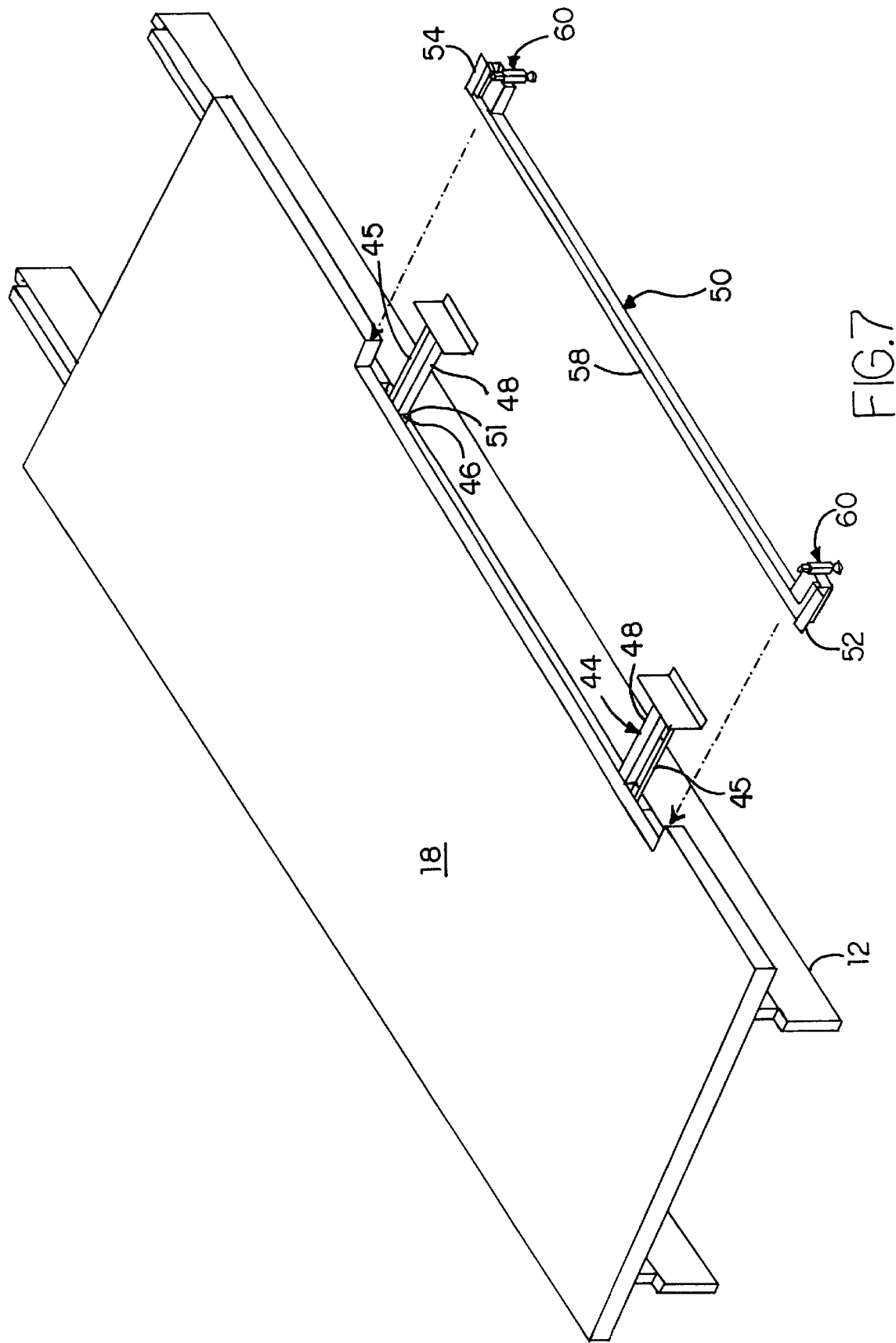
FIG. 7 is a fragmentary view in perspective of the edge unit which attaches to the edge of the main floor.

The embodiment described herein is not intended to limit the scope of the invention to the precise form disclosed. Rather, the embodiment has been chosen and described to explain the principles of the invention and its application and practical use to best enable others skilled in the art to follow its teachings.

Referring now to FIGS. 1 and 2 of the drawings, mobile living quarters generally indicated by the reference numeral 10 includes a frame 12 supported by an axle 14 and wheels 16. A main floor 18 is supported by the frame 12, and sidewalls 20, 22 and ceiling 24 cooperate with floor 18 to define a main living area 26. An opening 28 is formed in the sidewall 22 for receiving a slide out or retractable room generally indicated by the reference numeral 30. The retractable or slide out room 30 includes a ceiling 32, a floor 34, an outer wall 36, and a pair of sidewalls 38. Sidewalls 38, floor 34, and ceiling 32 define an open end 40 such that when the slide out or retractable room 30 is moved into the extended position illustrated in FIG. 2, access is provided into the auxiliary living area 37 from the main living area 26. A lip 42 carried on the ceiling 32 and sidewalls 38 of the slide out or retractable room 30 extends at least part of the way around the opening 40 and is adapted to seal the interface between sidewall 22 and slide out room 30 at the opening 28.

As shown in FIG. 3, the slide out room 30 is supported on the frame 12 by a pair of extensible members generally indicated by the numeral 44. Although only a single pair of extensible members 44 is illustrated, additional sets of extensible members 44 may be necessary in order to support the room 30 for movement relative to the unit 10. The number of extensible members 44 required will depend on the weight of the room and the flexural stiffness of the members 44. Extensible members 44 further include an outer tube or channel member 46 which is secured to frame 12 and inner tube 48 which is slideably received within, and supported by, the outer tube 46. The inner tube 48 extends from end 51 of the outer tube 46 and is secured to the outer wall 36 of retractable room 30 to support and guide the latter for movement relative to the frame 12. Outer wall 36 preferably includes a moveable frame member 37 which strengthens outer wall 36 and which further provides a convenient reinforced attachment point for connecting the inner tube 48 to the outer wall 36. Room 30 is extended or retracted by one or more hydraulic rams 45 or similar means as are commonly employed in the art.

Figure 8:
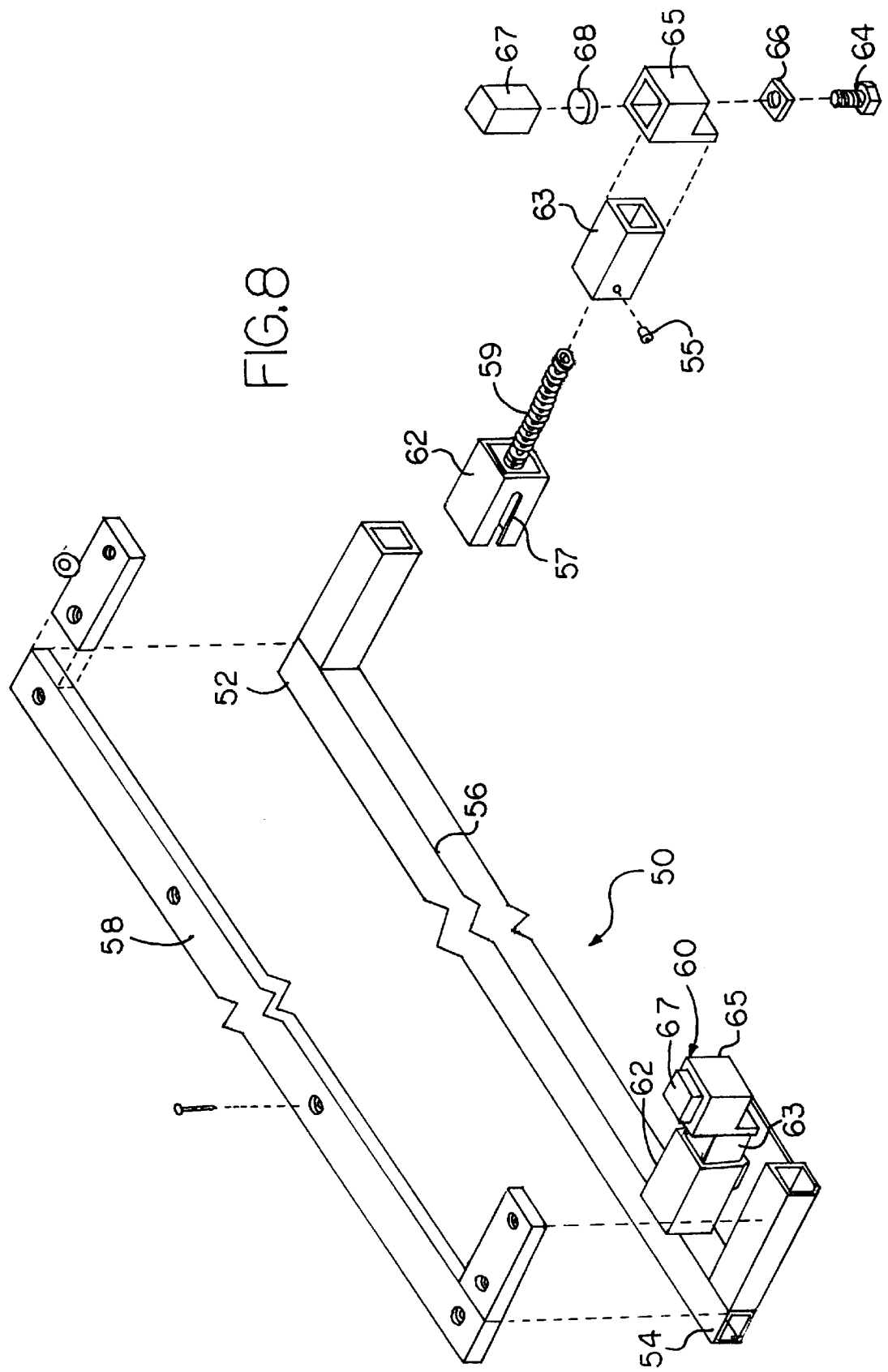
FIG. 8 is an enlarged exploded view in perspective of the edge unit for attachment to the edge of the main floor showing the nylon wear bar and the spring loaded sidewall height adjustment mechanism.

Referring now to FIGS. 3 and 8, main floor 18 includes an edge unit 50 having a pair of ends 52, 54 and an interconnecting side edge 56. Each of ends 52, 54 and edge 56 has mounted thereon a camming surface or wear bar 58, which cams against the inner edge of floor 34 as explained in greater detail below. Wear bar 58 is preferably constructed of nylon or any suitable substitute offering a long wearing smooth sliding surface having relatively low surface friction. Wear bar 58 is preferably screwed, bonded, or otherwise secured to edge unit 50.

A retractable height adjuster 60 is mounted to edge unit 50 adjacent each of ends 52, 54. Each adjuster 60 includes an outer tube 62 and an inner member 63 which is reciprocally disposed within tube 62. A spring 59 is mounted within tube 62 and abuts member 63, which urges member 63 outwardly away from vehicle 12. When the slide out room 30 is moved towards the retracted position, a portion of the slide out room contacts adjuster 60 and compresses spring 59, thus moving adjuster 60 out of the way when the room is in the retracted position. Preferably, tube 62 includes a horizontal guide slot 57 which is engaged by a stop member 55 on member 63. Stop member 55 and guide slot 57 cooperate to guide and limit the reciprocating movement of member 63 relative to tube 62. Adjuster 60 includes a housing 65 attached to the end of tube 63, and a threaded adjustment bolt 64 engages a nut 66 attached to housing 65 so that bolt 64 extends upwardly through housing 65. A wear member including post 67 having a metal plate or washer 68 is disposed within housing 65 in abutment with bolt 64. Post 67 is preferably constructed of nylon to provide a smooth, low friction sliding surface for supporting sidewalls 38 of slide out room 30 as will be explained in greater detail below. Rotation of the adjustment bolt 64 raises or lowers post 67 relative to the housing 65 and thus relative to the elevation of main floor 18. Thus, when sidewalls 38 are supported by post 67 as is shown in FIG. 17, bolt 64 can be used to raise or lower the elevation of slide out room 30.

Figure 20:
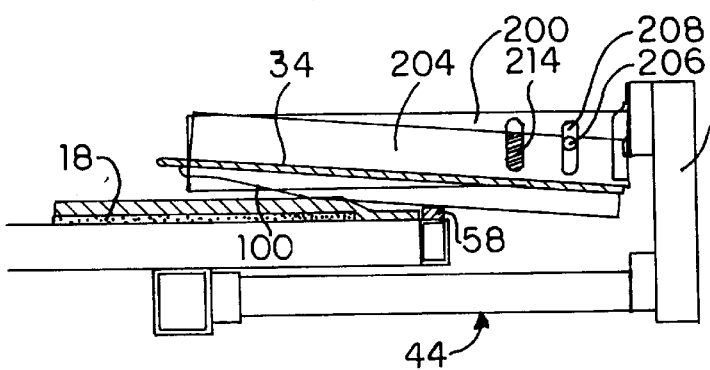
FIGS. 20 and 21 are views similar to FIG. 19, but illustrating the room in intermediate positions between the fully retracted position of FIG. 19 and the fully extended position.

As shown in FIGS. 14, 16 and 17, as the slide out room 30 is extended towards the extended position of FIG. 20, the weight of the room 30 causes member 44 to deflect downwardly, which causes outer wall 36 and the sidewalls 38 to deflect downwardly as well. Accordingly, a portion of the sidewalls 38 eventually drop into contact with post 67, which supports the sidewalls 38 and which minimizes further downward deflection of member 44 and thus outer wall 36 and sidewalls 38.

The outer edge 68 of floor 34 is attached to outer wall 36 by an elongated hinge 70. The deflection of the member 44 permits the floors 34 of the slide out room 30 to drop into a position substantially flush with the floor 18.

As can be seen in FIGS. 4 and 5, an angled bracket 72 having an upwardly extending vertical leg 74 and a horizontal leg 76 is screwed, bolted, or otherwise secured to outer edge 68 of floor 34 by a plurality of fasteners (not shown). Similarly, an angled bracket 78 having an downwardly extending vertical leg 80 and a horizontal leg 84 is screwed, bolted, or otherwise secured to outer wall 36 of slide out room 30 by a plurality of fasteners (not shown). Horizontal legs 76, 84 of brackets 72, 80 each include a series of aligned apertures 86, 88, respectively. A plurality of bolts 90 each having a nut 92 are disposed through apertures 86, 88, and a plurality of resilient grommets or washers 94 engaging bolts 90 are positioned between horizontal legs 76, 84 of brackets 72, 80, respectively. Washers 94 are preferably manufactured of a resilient flexible material such as rubber, although suitable commercially available substitutes may be used. Accordingly, the hinge 70 between floor 34 and outer wall 36 permits floor 34 to pivot about an axis parallel to the longitudinal axis of brackets 72, 80.

As shown in FIGS. 3 and 6, a ramp member 96 having a pair of ends 97, 99 is screwed, bolted, glued or otherwise secured to inner edge 98 of floor 34. Member 96 includes an angled portion or ram 100 terminating in a lip 102. Preferably, floor 34 includes a floor covering 104 which conceals the member 96 and which matches or otherwise complements a similar floor covering 106 on main floor 18. As shown in FIG. 17, when the slide out room is retracted into the main living area 26, the angled portion or ramp 100 cams against the wear bar 58 of edge unit 50, which raises the inner edge 98 of floor 34. As outlined above, the hinge 70 between floor 34 and outer wall 36 permits floor 34 to pivot about an axis parallel to the longitudinal axis of brackets 72, 80. When the room is fully extended, end 102 of member 96 rests on wear bar 58, which allows the inner edge 98 of floor 34 to drop sufficiently such that the floor surfaces 106 and 104 are generally coplanar.

Figure 9:
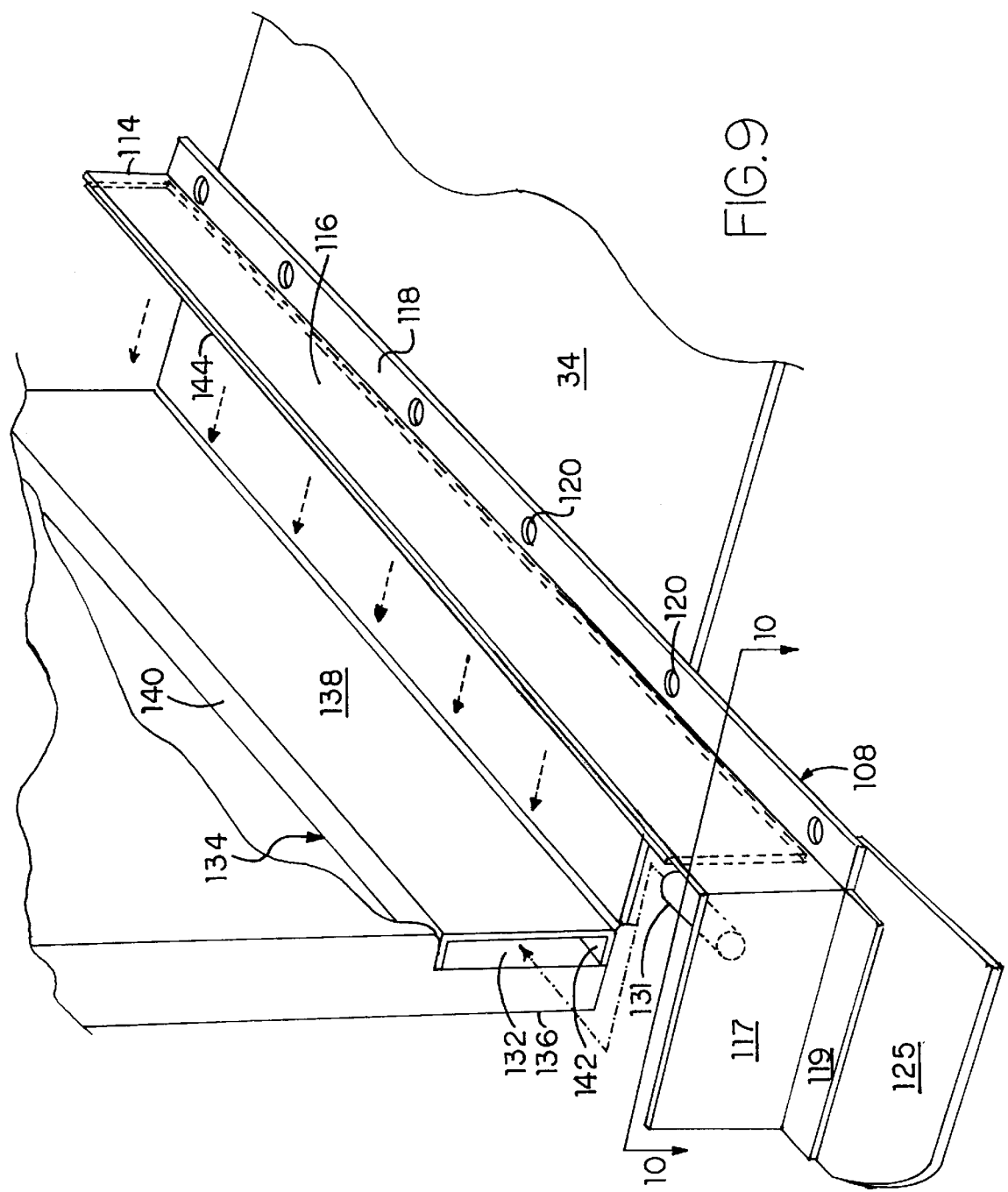
FIG. 9 is a fragmentary exploded view in perspective of the circumscribed portion of FIG. 3 illustrating the floor edge cover which seals the interface between the moveable floor and the sidewalls and which further engages and lifts the sidewall as the slide out room is retracted.
Figure 10:
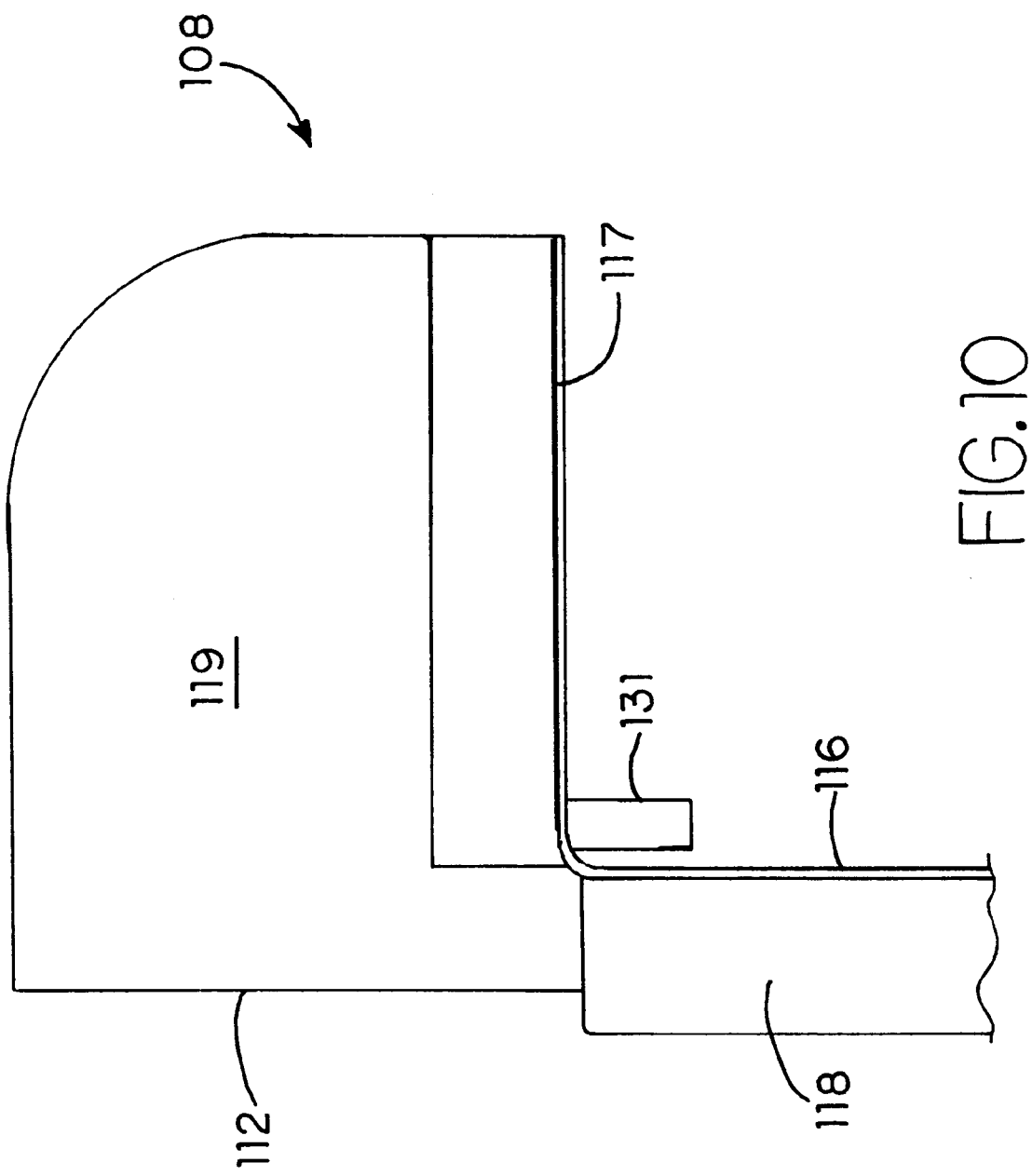
FIG. 10 is a fragmentary top plan view taken along lines 10—10 of FIG. 9 showing the inner end of the edge cover.
Figure 11:
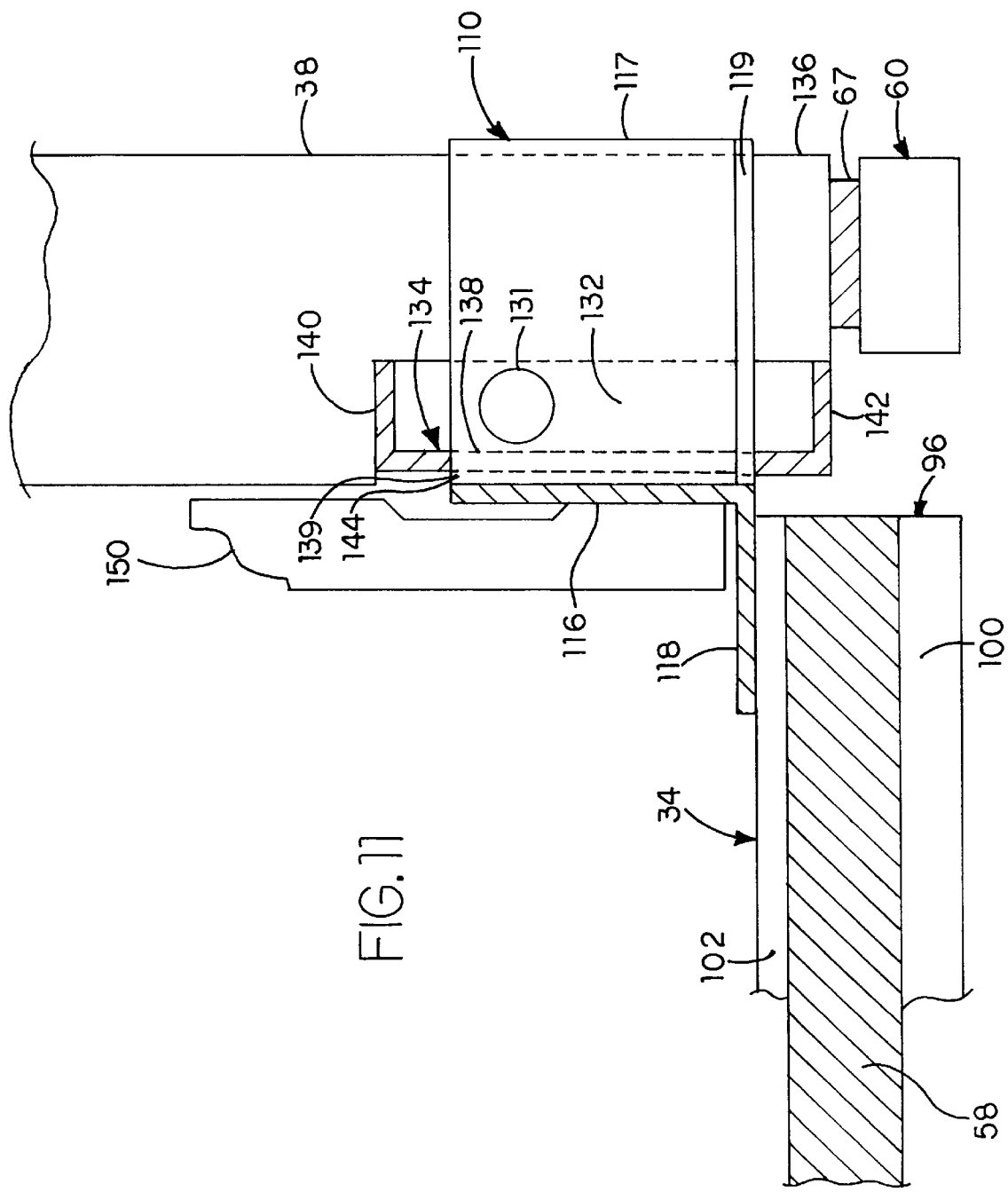
FIG. 11 is an enlarged cross-sectional view taken along lines 11—11 of FIG. 3 showing the alignment rod engaging the sidewall of the slide out room and also showing the height adjuster supporting a portion of the sidewall.
Figure 12:
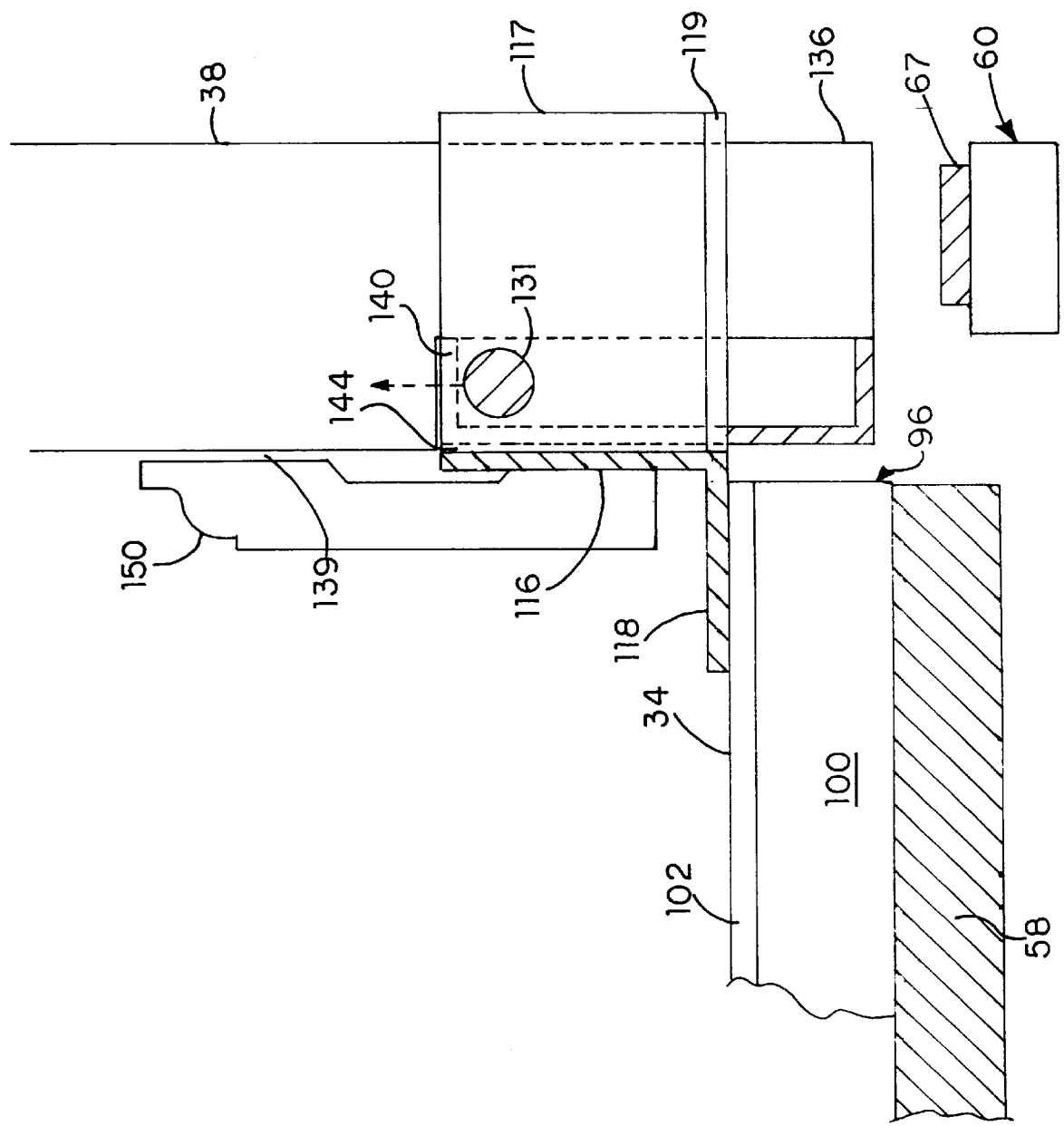
FIG. 12 is an enlarged cross-sectional view similar to that shown in FIG. 11 but illustrating the alignment rod in a raised position supporting a portion of the sidewall and lifting the sidewall off the height adjuster.

Referring now to FIGS. 3, 9 and 10, an end cover 108, 110 is attached to each of sides 110, 111, respectively, of floor 34. Only cover 108 will be described in detail, but it will be understood that cover 110 is the mirror image of cover 108. Cover 108 includes inner and outer ends 112, 114, a pair of vertical legs 116, 117, and a pair of horizontal legs 118, 119. Horizontal leg 118 includes a plurality of mounting holes 120 for securing the covers 108, 110 to the side edges 122, 124, respectively of floor 34. End 112 of cover 108 includes a laterally extending portion 126. Vertical segment 117 has an outwardly extending alignment plug or rod 131 attached thereto, which extends outwardly away from the main living area 26. Rod 131 fits into and engages a cavity 132 defined by a reinforcing channel 134 attached to the bottom edge 136 of each of the sidewalls 38 of slide out room 30. Channel 134 includes a central web 138, and upper and lower flanges 140, 142. As can be seen in FIGS. 11 and 12, as the inner edge 98 of floor 34 raises and lowers relative to sidewalls 38, covers 108, 110 move up and down along with the inner edge 98 of floor 34. In the process, alignment rod 131 moves vertically within cavity 132 of channel 134.

When the floor 34 is raised sufficiently relative to sidewalls 38, alignment plug 131 contacts the upper flange 140 of channel 134. Any further upward motion of floor 34 effectively raises the sidewalls 38. Alignment rod 131 also prevents any lateral movement of sidewall 38 away from end covers 108, 110 or side edges 122, 124 of floor 34, which thus maintains a generally constant gap 139 between leg 116 and channel 138, and which also prevents the sidewalls 38 from splaying apart as the slide out room 30 is retracted into the vehicle 12. As shown in FIG. 12, a weather seal 144 is attached to leg 116, which thus seals the gap 139 between cover 108 and channel 138. Accordingly, seal 144 prevents the ingress of dirt, water, or other contaminants into the slide out room 30 when the room is extended.

In operation, after the vehicle 12 has been parked, the slide out room 30 is extended from the position shown in FIG. 1 towards the position shown in FIG. 2 using the hydraulic rams 45. As this occurs, the floor 34 moves from the elevated position shown in FIG. 13, in which the floor 34 overlies the main floor 18, towards the lowered position shown in FIG. 15 in which the floor 34 is generally coplanar with the main floor 18. As shown in FIG. 14, as the slide out room 30 approaches the extended position, the ramp or angled portion 100 of member 96 slides over the wear bar 58 of edge unit 50 as the inner edge 98 of floor 34 is lowered. The hinge 70 at outer edge 68 permits the floor 34 to pivot relative to the outer wall 36. At the same time, the weight of the slide out room 30 causes the inner member 46 of extensible supports 44 to deflect downwardly as shown to advantage in FIGS. 13 through 15. This downward deflection essentially lowers the outer edge 68 of floor 34 to a point generally level with or slightly above inner edge 98. The amount of downward deflection can to some extent be controlled by the number and stiffness of the extensible members. Preferably, the desired amount of downward deflection is then achieved by taking into consideration the weight of the slide out room 30.

Referring now to FIGS. 2, 16 and 17, adjusters 60 permit the operator to adjust the final height of the slide out room 30. As can be seen in FIGS. 16 and 17, the bottom edge 136 of sidewalls 38 come into contact with and rest upon post 67 of adjusters 60 as the room 30 is extended. If the adjuster 60 is positioned higher, the upward force of post 67 on the inner edges 137 of the sidewalls 38 will cause the outer wall 36 of room 30 to be slanted slightly, such that the lip 42 will contact sidewall 22 earlier. As the room 30 continues to be extended, the room 30 will rotate slightly about the contact point between lip 42 and sidewall 22, which in effect raises the outer wall 36 upwardly and lessens the downward deflection of the support members 44. When the post 67 is lowered, the outer wall 36 will have a greater downward deflection, and thus the angle of the floor 34 relative to the main floor 18 can be effectively controlled by raising or lowering the post 67 using adjustment bolt 64. The spring 59 disposed within tube 62 permits the adjuster 60 to retract against the edge unit 50 when the slide out room 30 is retracted, so that the outer wall 36 will seal flush against the sidewall 22 of main living area 26 when the room 30 is retracted.

Referring now to FIGS. 9 through 15, the function and operation of the end covers 108, 110 will be explained. When the slide out room 30 is in the fully retracted position shown in FIG. 13, the floor 34 has been raised by the action of member 96 against wear bar 58. End covers 108, 110 move up and down along with the inner edge 98 of floor 34, thus causing the alignment plug 131 to rise and fall within the cavity 132 of channel 134. When the floor 34 is raised sufficiently, alignment plug 131 abuts the top flange 140 of channel 134, thus raising the sidewalls 38 off of the main floor 18. Accordingly, the type of rollers commonly employed in the industry under the sidewalls are not required in the present application. As the slide out room 30 is extended, the alignment plug 131 of the end covers 108, 110 slowly lowers the sidewalls 38 until the sidewalls are supported by the post 67 of adjusters 60 as discussed above. Because the alignment plug 131 also prevents the sidewalls walls from splaying, the gap between the interior floor trim 150 and the sidewall 38 remains constant, and thus there is a better seal between the edges of the floor 34 and the sidewalls of the room 30, and marring of the interior wall coverings is prevented.

Referring now to the embodiments of FIGS. 18–22, a channel member or plate 200 is mounted adjacent each of the side edges 202 of the floor 34 of the slide out room 30. The channel member or plate 200 extends parallel, and closely adjacent to, another channel member or plate 204 which is integrally mounted within the corresponding wall 38. A pin 206 projects from the plate 200 in a direction substantially parallel to the floor 34 and engages an elongated, vertically oriented slot 208 of the channel member or plate 204. A tab 210 is punched out of the plate 200 and extends transversely with respect thereto. The tab 210 is slidably received in an elongated slot 212 which extends vertically substantially parallel to the slot 208. A coiled spring 214 extends between the tab 210 and a lower transverse end 216 of the plate 204 to thereby yieldably bias the plate 200, and therefore the floor 13, upwardly viewing the drawings. The plates 200 and 204, the pin 206, the tab 210 and the spring 214 are substantially identical, but of opposite hand, on the opposite sides of the floor 34. Retractable height adjusters (not shown) similar to the retractable height adjusters 60 are used to support the sidewalls 38 as the slide out room 30 moves into the extended position.

Figure 19:
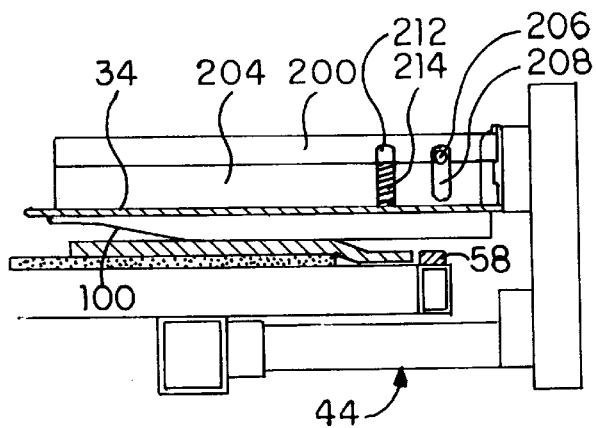
FIG. 19 is a view taken substantially along lines 19—19 of FIG. 18, but illustrating the relative positions of the walls of the slide out room and the main floor when the slide out room is in the fully retracted position.
Figure 21:
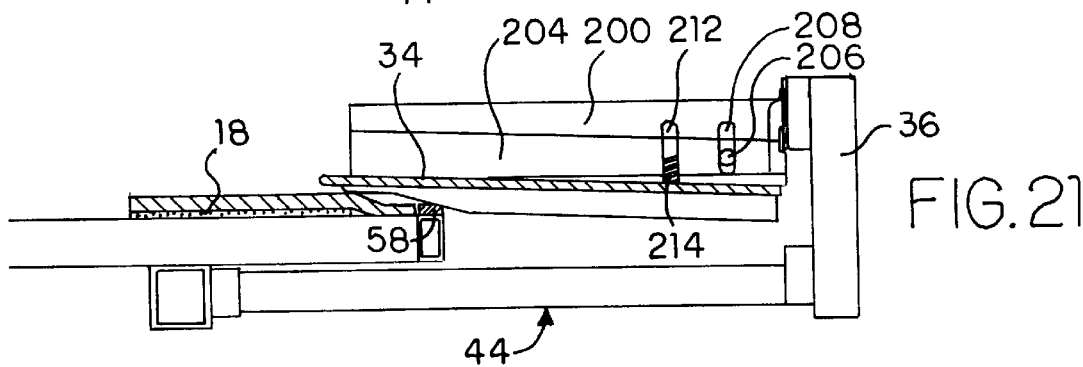
Figure 22:
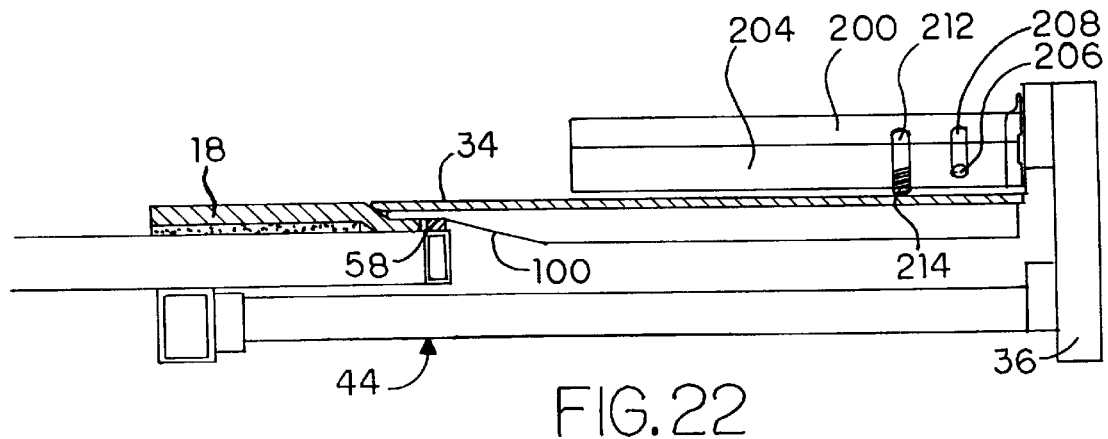
FIG. 22 is a view similar to FIG. 19, but illustrating various components of the slide out room in the positions which they assume when the slide out room is in the fully extended position.
Figure 29:
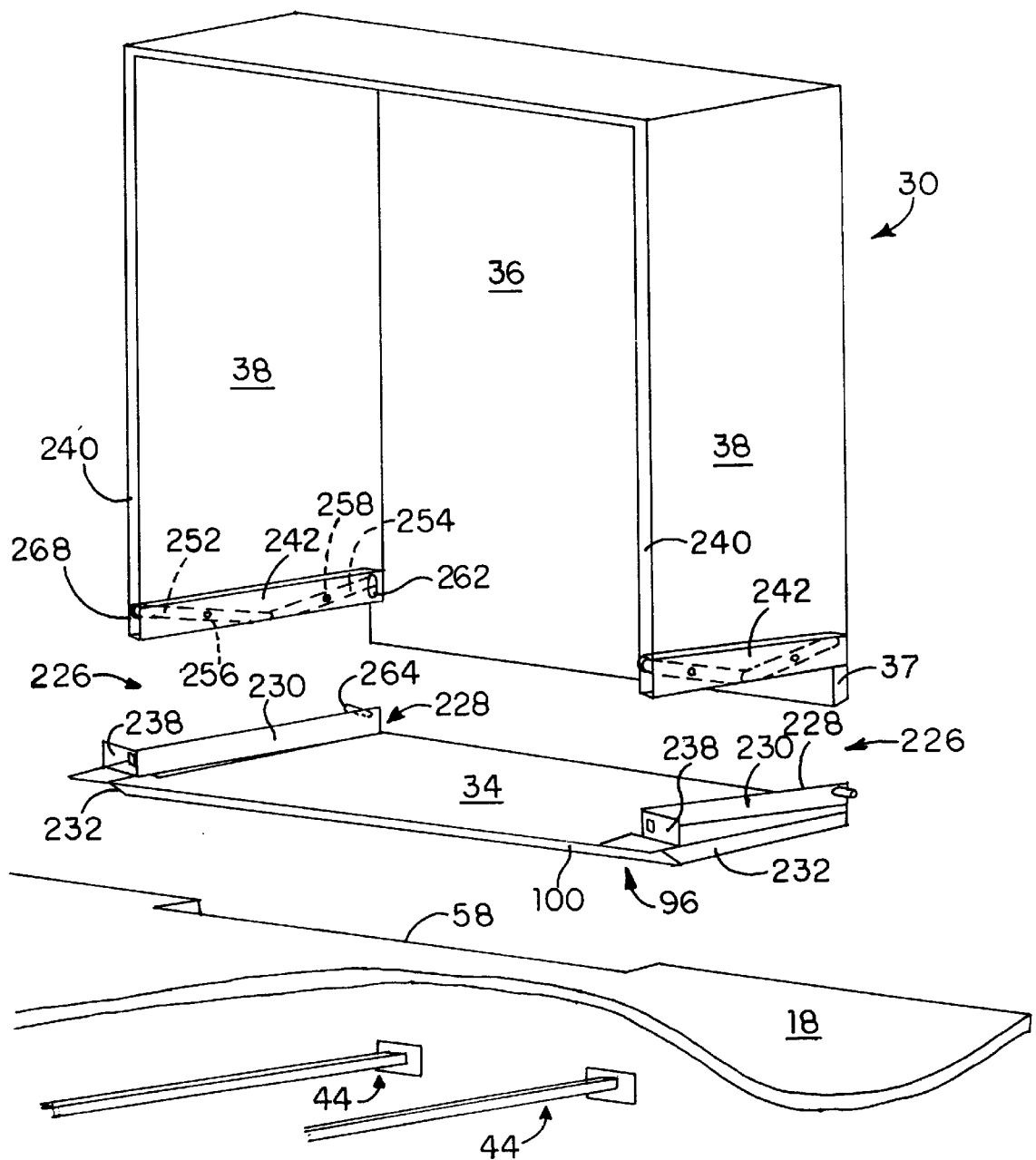
FIG. 29 is a fragmentary, exploded, view in perspective of a slide out room and a portion of the main living quarters made pursuant to still another embodiment of the invention.
Figure 30:
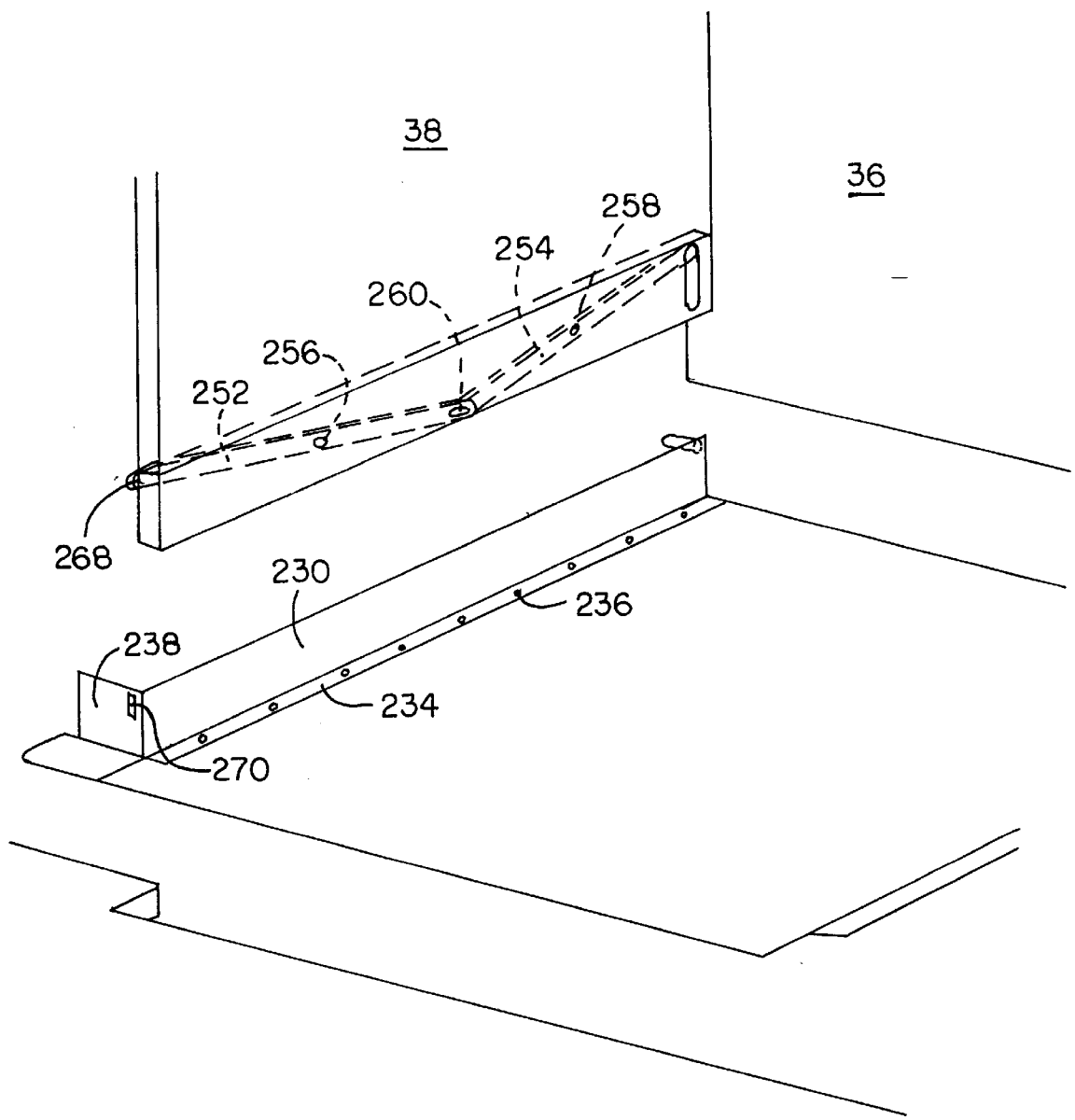
FIG. 30 is an enlarged, fragmentary, view in perspective of a portion of a sidewall and a portion of the floor of the slide out room illustrated in FIG. 29.
Figure 31:
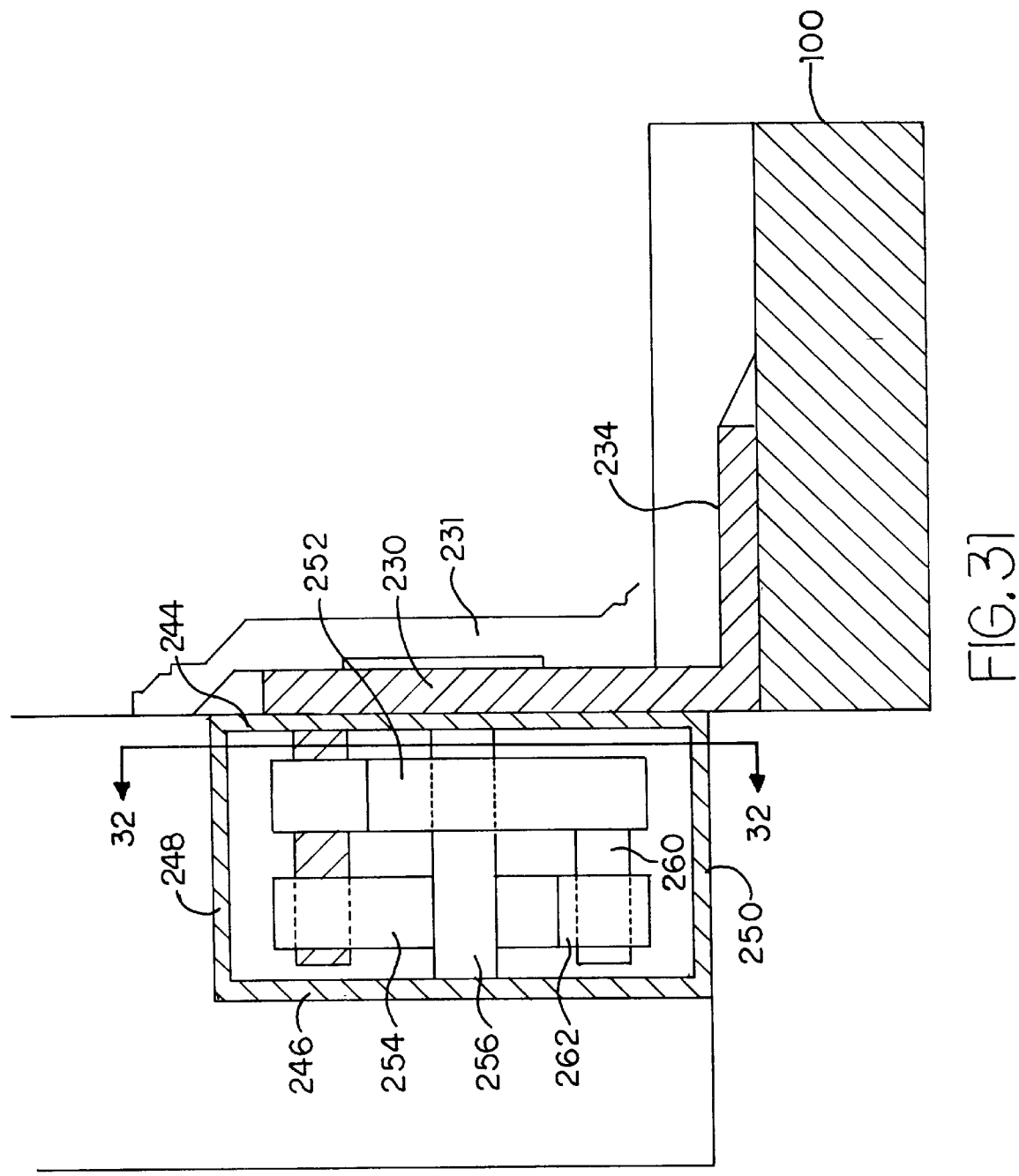
FIG. 31 is a cross sectional view taken parallel to the front wall of the slide out room through the end wall and a portion of the floor of the slide out room.

When the slide out room 30 is in the extended position (FIG. 22), the floor 34 is in the lowered position and is substantially flush with the floor 18 of the main living unit. In this condition, the floor 34 is supported relative to the slide out room 30 by the wear bar 58 and engagement of the pins 206 with the lower end of the corresponding slots 208. As the extensible members 44 are retracted to retract the slide out room 30 into the main living area, ramp 100 rides up the wear bar 58 as illustrated in FIGS. 20 and 21, thereby causing the pins 206 to ride upwardly in their corresponding slots 208 and also causing the channel members or plates 200 to pivot about the pins 206, to thereby allow the floor 34 to pivot about the wear bar 58 as illustrated in FIGS. 21 and 22. The spring 214 flexes to allow pivoting of the plate 200 with respect to the plate 202, and exerts an upwardly biasing force on the floor 34. Obviously, because of the weight of the floor 34 and any furniture, etc. resting on the floor, the floor will reach a point in which the wear bar 58 acts as a fulcrum to allow the floor to pivot about the wear bar 58 into a substantially horizontal orientation as illustrated in FIG. 19. The floor will pivot into the horizontal orientation whenever the floor is retracted past the wear bar 58 to an extent that the weight acting on the portion of floor 34 to the left of the wear bar 58 overcomes a force equal to the sum of the force exerted by the spring 214 and the weights acting on the floor 34 to the right of the wear bar 58. The spring 214 thus acts to bias the floor upwardly as the floor moves into the substantially flat position illustrated in FIG. 19. When the room is moved from the retracted position of FIG. 19 to the extended position of FIG. 22, the spring 214 cushions and delays movement of the floor into the lowered position so that the floor does not move abruptly into the substantially flat orientation.

Referring now to the embodiment of FIGS. 23–25, extensible members 44 are mounted to wall 36 of slide out room 30 through a bracket 220 mounted on the lower portion of wall 36. The bracket 220 includes a pair of elongated, vertically oriented slots 222 which slidably receive pins 224 extending from extensible member 44. The floor 34 is connected to the wall 36 through the hinge 70 as described hereinabove. Accordingly, as the slide out room 30 is retracted from the extended position illustrated in FIG. 25 to the retracted position illustrated in FIG. 23, the floor 34 initially pivots about the hinge 70 as the ramp 100 initially rides up the wear bar 58. However, at some point during the travel of the wear bar 58 along the ramp 100, the weight of the floor 34 and the furniture, etc. acting on that portion to the left of the fulcrum provided by the wear bar 58 overcomes the weight of the floor to the right of the fulcrum provided by wear bar 58, thereby causing the bracket 220 to ride up the pins 224, thus raising the wall 36 to the position illustrated in FIG. 24, wherein the floor 34 is gradually leveled out. As the room is fully retracted from the FIG. 24 position to the FIG. 23 position, further movement of the ramp 100 up the fulcrum provided by the wear bar 58 continues to raise the room 30 and wall 36 relative to the extensible member 44, until the pins 224 rest at the bottom of the slots 22. It will be noted that in the fully extended position, the pins 20 and 24 rest on the top of the slots 222, thereby supporting the room through the members 44. As the room is moved into the retracted position, the weight of the room is borne through the floor 34 onto the floor 18. It will be noted that the embodiment of FIGS. 23–25, since the sidewalls 38 are disconnected from the floor 34, will require the retractable height adjuster 60 (which are not shown in FIGS. 23–25) to support the walls 38 when the room is moved into the fully extended position.

The embodiment of FIGS. 26–28 is identical to the embodiment of FIGS. 23–25, except that the floor 34 of the slide out room is rigidly connected to the wall 36 as at 226, instead of being connected through the hinge 70. The floor 34 is also rigidly connected to the sidewalls 38. Accordingly, the slide out room 30 in the embodiment of FIGS. 26–28 is an integral unit, so that the height adjusters 60 are not necessary. In the embodiment of FIGS. 26–28, the weight of the slide out room 30, including any furniture situated therein, acting to the left of the fulcrum provided by the wear bar 58 acting against the ramp 100 causes the sliding connection between the extensible members 44 and the wall 36 provided by the pins 224 acting in slots 222 to cause the entire room 30 to move upwardly when the room is retracted and downwardly relative to the extensible members 44 when the room is extended. Accordingly, the pins 224 move from engagement at the top of the slots 222 when the room is fully extended, as illustrated in FIG. 28, and thus the weight of the room is borne through the pins 224 and bracket 220 and also through the wear bar 58. In the retracted position, the weight of the room is born directly on the floor 18.

Referring now to the embodiment of FIGS. 29–34, the slide out room generally indicated by the numeral 30 is adapted to be extended and retracted between the positions illustrated in FIG. 1 and FIG. 2. Extensible support members 44 mounted on main frame members 12 (not shown in FIGS. 29–34) are attached to the lower frame member 37 of outer wall 36. The floor 34 is adapted to move vertically with respect to the walls 36 and 38 and is connected thereto by connecting mechanisms 226, which moveably connect opposite sides of the moveable floor 34 to corresponding sidewalls 38. As described above, the moveable floor 34 includes a ramp 96 including an angled portion 100, that is adapted to ride up and over the wear bar 58 when the room 30 is retracted into the main living quarters, thus elevating the moveable floor 34 from a flush position in which the floor 34 is substantially flush with the main floor 18 to a raised or sliding position in which the floor 34 can slide along the main floor 18. The operation of the floor 34, wear bar 58, and ramp 96 is more fully described above.

The connecting mechanisms 226 include floor side members 228, each of which includes an upwardly extending flange 230 extending along the sides 232 of the floor 234. The flange 230 may be concealed by a baseboard 231. Each of the floor side members 228 further includes a horizontally extending flange 234 that projects from the flange 230 to attach the floor side members 228 to the floor 34 via fasteners 236. Transversely extending flanges 238 project outwardly from the flanges 230 and extend over the ends 240 of the sidewalls 38.

Connecting mechanisms 226 further include box channel members 242, which are installed within the lower most portions of the sidewalls 38. Each of the box channel members include inner and outer vertically extending walls 244, 246, which are interconnected by top and bottom walls 248, 250. A pair of levers 252, 254 are installed within the box channel members and are pivotally connected to sidewalls 244, 246 by pivot pins 256, 258. Accordingly, each of the levers 252, 254 may pivot about their corresponding pivots 256, 258 their movement being restricted by the top and bottom walls 248, 250. A pivot pin 260 interconnects adjoining ends of the levers 252 and 254, the lever 254 having an oversized opening 262 to allow the levers to pass through an overcenter position so that the levers can be pivoted from the position illustrated in FIG. 32 through the position illustrated in FIG. 34 to the position illustrated in FIG. 33. The wall 244 of each of the channel members includes an elongated, vertically oriented slot 262, which receives a pin 264 that projects from the corresponding flange 230 to the corresponding slot 262 and into an elongated aperture 266 the corresponding end of the lever 254.

The end of lever 252 opposite the end connected to lever 254 via pivot pin 260 includes a portion 268 that projects from the end of the box channel member 242 and engages an elongated, vertically directed slot 270 in the flange 238. Accordingly, when the floor 34 is in the lowered or flush position when the slide out room 30 is extended, the levers 252, 254 assume the position illustrated in FIG. 33, it being remembered that the end portion 268 of lever 252 is engaged with the slot 270. As the slide out room is retracted, the ramp surface 100 rides up the wear bar 58, thus causing the end portion 268 of lever 252 to be urged upwardly viewing the figures by engagement of the end portion 262 by the lower edge of the slot 270. As the ramp 100 rides up the wear bar 58, the levers 252, 254 pass through the position illustrated in FIG. 34, and when the floor 34 is moved to the upward-most sliding position in which the floor 34 may slide on the main floor 18, the levers are in the upper position illustrated in FIG. 32. Accordingly, as the ramp surface 100 rides up the wear bar 58, upward movement the ramp surface 100 is transferred by operation of the levers 252, 254 and the pin 264 to also raise the out edge of the floor 34 adjacent the outer wall 36. In this way, the floor 34 is maintained substantially level as the slide out room is retracted. Conversely, when the slide out room is extended, the ramp surface 100 rides down the wear bar 58 thus pivoting the lever 252 (and thereby lever 254) from the upper position illustrated in FIG. 32 to the lower position illustrated in FIG. 33, thereby lowering the edge of the floor 34 adjacent the wall 38 as the ramp surface 100 descends, again maintaining the floor 34 at a substantially horizontal orientation, thus preventing shifting of furniture or other household goods stored on the floor 34.

It is understood that the above description does not limit the invention to the above-given details, but may be modified within the scope of the following claims.

What is claimed is:

1. Transportable living quarters having a main living area having a main floor and a slide out room assembly extendable from the main living area to an extended position to provide an auxiliary living area and retractable to a retracted position within the main living area when the transportable living quarters is moved, an extendable member mounted on the main living area and secured to the slide out room for extending and retracting the slide out room, said slide out room including a pair of side walls, an outer wall extending between said side walls, and a slide out room floor connected to one of said walls for movement relative to said walls, said main living area defining a fulcrum across which said slide out room floor moves as the slide out room is extended and retracted, said slide out room floor having an inner edge slidable and pivotable with respect to said fulcrum and an opposite outer edge adjoining said outer wall whereby said slide out room floor slides and pivots about said fulcrum as the slide out room is extended and retracted to move said slide out room floor between a flush position flush with the main floor when the slide out room is extended to a sliding position sliding on said main floor to permit retraction of the slide out room into the main living area.

2. Transportable living quarters as claimed in claim 1, wherein a pivot connection pivotally mounts said slide out room floor for pivoting relative to one of said walls.

3. Transportable living quarters as claimed in claim 2, wherein said pivot connection is a hinge connecting said outer edge of the slide out room floor to said outer wall, said slide out room floor moving relative to said side walls when the slide out room floor slides and pivots over the fulcrum.

4. Transportable living quarters as claimed in claim 1, wherein a pivot connection connects said slide out room floor to both of said side walls.

5. Transportable living quarters as claimed in claim 4, wherein said pivot connection includes a slot and a pin slidably engaging said slot, said slot permitting the slide out room to move vertically with respect to said walls as said slide out room floor pivots.

6. Transportable living quarters as claimed in claim 5, wherein a spring exerts a biasing force between said slide out room floor and said walls.

7. Transportable living quarters as claimed in claim 1, wherein a linkage responsive to pivoting of said inner edge about said fulcram raises and lowers said outer edge in response to pivoting of said inner edge to thereby maintain the slide out floor substantially horizontal as the slide out room is extended and retracted.

8. Transportable living quarters as claimed in claim 7, wherein said linkage includes a pair of levers pivotally mounted on one of said side walls and pivotally connected to one another, one of said levers being pivotally connected to said inner edge, the other lever being pivotally connected to said outer edge.

9. Transportable living quarters comprising:
a frame, a main floor supported by said a frame, and means extending from said main floor to define with said main floor a main living area,;
a slide out room assembly mounted on a moveable frame for movement from a retracted position retracted into the main living area to an extended position extended from the main living area to provide an auxiliary living area, said slide out room assembly including an auxiliary floor having an outer edge, an inner edge, and a pair of interconnecting side edges, said auxiliary floor being connected to the moveable frame by a pivot connection to permit said auxiliary floor to pivot relative to the moveable frame;
extendable supporting means connecting the moveable frame to the fixed frame for supporting the moveable frame; and
camming means carried by the fixed frame and engaging said auxiliary floor for lowering said auxiliary moveable floor inner edge towards a lowered position flush with the main floor as said slide out room is extended towards said extended position and further for raising said auxiliary floor inner edge towards a raised position overlying the main floor as said slide out room is moved towards the retracted position, whereby when said slide out room is in the extended position said auxiliary floor and said main floor form a generally coplanar horizontal floor surface.

10. The device as claimed in claim 9, wherein said slide out room further including a top wall, an end wall, and a pair of sidewalls, said top wall, said end wall, and said sidewalls defining with said auxiliary floor said auxiliary living area, and height adjustment means engaging said sidewalls for adjusting the height of said slide out room when said room is in said extended position.

11. The device as claimed in claim 10, wherein each of said sidewalls include a bottom edge, and said height adjustment means includes an adjustable member attached to the fixed frame, said adjustable member for abutting said sidewall bottom edges when said slide out room is in said extended position.

12. The device as claimed in claim 11, wherein said adjustable member includes a wear member supported on an adjustable bolt, said wear member being positioned for contact with its adjacent said sidewall bottom edge as said slide out room is extended towards said extended position.

13. The device as claimed in claim 11, wherein said each of said bottom edges includes a reinforced surface, said adjustable member abutting said reinforced surface when said slide out room is in said extended position.

14. The device as claimed in claim 10, including wall lifting means carried by said auxiliary floor for lifting said sidewalls as said slide out room is moved towards said retracted position, said lifting means cooperating with said camming means.

15. The device as claimed in claim 14, said wall lifting means including an edge member attached to said auxiliary floor side edges, a portion of said edge member slidably engaging said sidewalls to thereby permit said auxiliary floor inner edge to move vertically relative to said sidewalls between a float position wherein said edge member portion is moveable vertically relative to said sidewalls and a lift position wherein said edge member portion abuts and lifts said sidewalls as said slide out room moves towards said retracted position.

16. Transportable living quarters as claimed in claim 2, wherein said extendable member including a downwardly deflecting portion permitting said slide out room floor to drop into the position flush with the main floor.

17. Transportable living quarters comprising a fixed frame supporting a main floor, and an enclosure extending from said main floor to define with said main floor a main living area;
a slide out room assembly mounted on a moveable frame and being extendable from the main living area to provide an auxiliary living area, said slide out room assembly including an auxiliary floor having an outer edge, an inner edge, and a pair of interconnecting side edges, a top wall, a pair of sidewalls, and an outer wall defining with said floor an auxiliary living area, said outer wall supported by said moveable frame, said auxiliary floor being pivotally connected to said moveable frame, to thereby allow a portion of said auxiliary floor to move vertically relative to said sidewalls, and an edge member attached to each auxiliary floor side edge, a portion of each said edge member slidably engaging its adjacent said sidewall to thereby permit said auxiliary floor inner edge to move vertically relative to said sidewalls between a float position wherein said edge member portion is moveable vertically relative to said sidewalls and a lift position wherein said edge member portion abuts and supports said sidewalls as said slide out room moves towards said retracted position; and
a camming bar carried by the fixed frame, said camming bar engaging said auxiliary floor as said slide out room is extended or retracted, thereby lowering or raising, respectively, said auxiliary floor inner edge and thereby lowering or raising said sidewalls.

18. The device as claimed in claim 17, wherein:
height adjustment means engages said sidewalls for adjusting the height of said slide out room when said room is in said extended position; and wall lifting means carried by said auxiliary floor for lifting said sidewalls as said slide out room is moved towards said retracted position.

19. The device as claimed in claim 18, wherein said wall lifting means includes an edge member attached to said auxiliary floor side edges, a portion of said edge member slidably engaging said sidewalls to thereby permit said auxiliary floor inner edge to move vertically relative to said sidewalls between a float position wherein said edge member portion is moveable vertically relative to said sidewalls and a lift position wherein said edge member portion abuts and lifts said sidewalls as said slide out room moves towards said retracted position.

20. The device as claimed in claim 18, wherein said wall lifting means includes a rod engaging each of said sidewalls, each of said rods being slideable within its adjacent sidewall along a vertical path, each said rod being fixed horizontally relative to its adjacent sidewall, said rods thereby maintaining a constant distance between said sidewalls as said room is retracted.

21. A transportable living quarters having a main frame supporting a main living area and a slide out room assembly extendable from the main living area to an extended position to provide an auxiliary living area and retractable into the main living area to a retracted position when the mobile living quarters is moved, said slide out room including a slide out floor, said slide out floor being slidable along a main floor defining the main living area when the slide out room is moved away from the extended position, a horizontally moving support member for supporting the slide out room as it is moved between the extended and restricted positions, and a sliding connection between the support members and the slide out room permitting said slide out room to slide relative to the support member in a substantially vertical direction to permit the slide out floor to drop into a position flush with the main floor, said sliding connection including a bracket mounted on said slide out room, a pair of vertically oriented slots in said bracket, a pair of integral protrusions extending from said support member defining pins rigidly connected to said support member and slidably received in said slots to constrain movement of the pins in the slots to a generally vertical direction.

22. Transportable living quarters as claimed in claim 21 wherein the horizontally moving support member includes an outer tube connected to the main living area and an inner tube received by the outer tube, the inner tube being connected to the slide out room.

23. Transportable living quarters as claimed in claim 21 wherein the bracket is mounted to a lower portion of the slide out room.

24. Transportable living quarters as claimed in claim 21 wherein the pins engage upper portions of the slots when the slide out room is in the extended position, thereby supporting a portion of the weight of the room.

25. Transportable living quarters as claimed in claim 21 wherein the slide out room includes a pair of side walls and an outer wall, the slide out room floor being rigidly connected to the side walls and to the outer wall.

26. Transportable living quarters as claimed in claim 21 wherein the slidable connection permits the slide out room to move substantially vertically upwardly as the room is moved into the retracted position, and substantially vertically downwardly as the room is moved into the extended position.

27. Transportable living quarters as claimed in claim 21 wherein the main living area includes a wear bar, the weight of the slide out room being supported by the slidable connection and the wear bar when the room is in the extended position.

28. Transportable living quarters as claimed in claim 27 wherein the slide out room floor engages the wear bar as the slide out room is moved between the extended and retracted positions.

29. Transportable living quarters as claimed in claim 21 wherein the slide out room floor includes an angled portion which engages the main living area as the room is moved between the extended and retracted positions.

30. Transportable living quarters having a main living area having a main floor and a slide out room assembly extendable from the main living area to an extended position to provide an auxiliary living area and retractable into the main living area to a retracted position when the mobile living quarters is moved, said main floor defining a fulcrum, said slide out room including a slide out floor pivotal with respect to said fulcrum and an opposite outer edge whereby said slide out floor slides over and pivots about said fulcrum as the slide out room is extended and retracted to move said slide out floor between a flush position flush with the main floor when the slide out room is extended to a sliding position sliding on said main floor to permit retraction of the slide out room, and means responsive to pivoting of said floor about said fulcrum for biasing said outer edge to thereby control movement of the slide out room floor as the slide out room is extended and retracted.

31. Transportable living quarters as claimed in claim 30, wherein said slide out room includes sidewalls and an outer wall, said means including a linkage having a lever pivotal with respect to said sidewalls and pivotally connected to said outer edge.

32. Transportable living quarters as claimed in claim 30, wherein said slide out room includes sidewalls and an outer wall, said means including a pair of levers pivotally mounted on one of said walls and pivotally connected to one another, one of said levers being pivotally connected to said inner edge, the other lever being pivotally connected to said outer edge.

33. Transportable living quarters as claimed in claim 30, wherein said slide out room floor is pivotally connected to the slide out room through a pin slidably received in a vertical slot, thereby permitting vertical and pivoting movement of the slide out room floor with respect to the slide out room.

34. Transportable living quarters as claimed in claim 33, wherein said means is a spring biasing said slide out room floor relative to the slide out room.

35. A transportable living quarters having a main frame supporting a main living area and a slide out room assembly extendable from the main living area to an extended position to provide an auxiliary living area and retractable into the main living area to a retracted position when the mobile living quarters is moved, said slide out room including a slide out floor, said slide out floor being slidable along a main floor defining the main living area when the slide out room is moved away from the extended position, a horizontally moving support member for supporting the side out room as it is moved between the extended and retraced positions, and a movable connection between the support members and the slide out room permitting said slide out room to slide relative to the support member in a substantially vertical direction to permit the slide out room floor to drop into a position flush with the main floor.

36. Transportable living quarters as claimed in claim 35 wherein the horizontally moving support member includes an outer tube connected to the main living area and an inner tube received by the outer tube, the inner tube being connected to the slide out room.

37. Transportable living quarters as claimed in claim 35 wherein the movable connection includes a bracket mounted to a lower portion of the slide out room having a slot which receives a pin connected to the moving support member.

38. Transportable living quarters as claimed in claim 37 wherein the bracket includes a pair of slots which receive a pair of pins connected to the moving support member.

39. Transportable living quarters as claimed in claim 38 wherein the slots are vertically elongated.

40. Transportable living quarters as claimed in claim 37 wherein the pin engages an upper portion of the slot when the slide out room is in the extended position, thereby supporting a portion of the weight of the room.

41. Transportable living quarters as claimed in claim 35 wherein the slide out room includes a pair of side walls and an outer wall, the slide out room floor being rigidly connected to the side walls and to the outer wall.

42. Transportable living quarters as claimed in claim 35 wherein the movable connection permits the slide out room to move substantially vertically upwardly as the room is moved into the retracted position, and substantially vertically downwardly as the room is moved into the extended position.

43. Transportable living quarters as claimed in claim 35 wherein the main living area includes a wear bar, the weight of the slide out room being supported by the movable connection and the wear bar when the room is in the extended position.

44. Transportable living quarters as claimed in claim 43 wherein the slide out room floor engages the wear bar as the slide out room is moved between the extended and retracted positions.

45. Transportable living quarters as claimed in claim 35 wherein the slide out room floor includes an angled portion which engages the main living area as the room is moved between the extended and retracted positions.

\* \* \* \* \*

UNITED STATES PATENT AND TRADEMARK OFFICE
CERTIFICATE OF CORRECTION

PATENT NO.    : 6,202,362 B1  
DATED         : March 20, 2001  
INVENTOR(S)   : Patrick W. McManus, James E. Dewald, Jr. and Martin P. McManus Page 1 of 1

It is certified that error appears in the above-identified patent and that said Letters Patent is hereby corrected as shown below:

<u>Claim 7,</u>
Line 23, replace "fulcram" with -- fulcrum --

<u>Claim 9,</u>
Line 36, delete "," after the word "area"

Signed and Sealed this

Twenty-seventh Day of November, 2001

Attest:

NICHOLAS P. GODICI
Attesting Officer   Acting Director of the United States Patent and Trademark Office